US006993070B1

(12) United States Patent
Berthet et al.

(10) Patent No.: US 6,993,070 B1
(45) Date of Patent: Jan. 31, 2006

(54) METHOD AND SYSTEM OF ITERATIVELY DETECTING AND DECODING RECEIVED SYMBOLS COUPLED WITH RE-ESTIMATION OF THE COEFFICIENTS OF THE TRANSMISSION CHANNEL

(75) Inventors: Antoine Berthet, Chatenay (FR); Raphaël Visoz, Issy-les-Moulineaux (FR)

(73) Assignee: France Telecom, Paris (FR)

( * ) Notice: Subject to any disclaimer, the term of this patent is extended or adjusted under 35 U.S.C. 154(b) by 987 days.

(21) Appl. No.: 09/636,237

(22) Filed: Aug. 10, 2000

(30) Foreign Application Priority Data

May 16, 2000 (FR) .................................. 00 06246

(51) Int. Cl.
*H03H 7/30* (2006.01)
*H03H 7/40* (2006.01)
*H03H 5/159* (2006.01)

(52) U.S. Cl. ..................... 375/232; 375/262; 375/341
(58) Field of Classification Search ........ 375/229–233, 375/262, 341, 346, 350; 714/794, 795
See application file for complete search history.

(56) References Cited

U.S. PATENT DOCUMENTS

| 5,263,033 | A | * | 11/1993 | Seshadri ..................... 714/792 |
| 5,533,063 | A | * | 7/1996 | Mitra et al. .................. 375/340 |
| 5,710,792 | A | * | 1/1998 | Fukawa et al. ............... 375/229 |
| 5,933,462 | A | * | 8/1999 | Viterbi et al. ................ 375/341 |
| 6,222,835 | B1 | * | 4/2001 | Franz et al. .................. 370/349 |
| 6,263,030 | B1 | * | 7/2001 | Khayrallah ................... 375/341 |
| 6,459,728 | B1 | * | 10/2002 | Bar-David et al. ............ 375/231 |
| 6,570,919 | B1 | * | 5/2003 | Lee ............................... 375/233 |
| 6,690,739 | B1 | * | 2/2004 | Mui .............................. 375/265 |

FOREIGN PATENT DOCUMENTS

EP 000682420 A1 * 11/1995

OTHER PUBLICATIONS

Catherine Douillard, et al., "Iterative Correction of Intersymbol Interference: Turbo-Equalization" European Transactions on Telecommunications and Related Technologies, IT, AEI, Milano, vol. 6, No. 5, Sep. 1, 1995, pp. 507-511.

Annie Picart, et al., "Turbo-Detection: A New Approach to Combat Channel Frequency Selectivity" IEEE International Conference on Communications, Jun. 8, 1997, pp. 1498-1502.

Volker Franz & Gerhard Bauch, "Iterative Channel Estimation for "Turbo"—Detection" No. 146, Mar. 1998, pp. 149-154.

Sergio Benedetto, et al., "Soft-Input Soft-Output Modules for the Construction and Distributed Iterative Decoding of Code Networks (1)" European Transaction on Telecommunications, Eurel Publication, Milano, IT, vol. 9, No. 2, Mar. 1, 1998, pp. 155-172.

Ferhard Bauch, et al., "Iterative Equalization and Decodind for the GSM—System" VTC1998, May 18-21, 1998, pp. 2262-2266.

(Continued)

*Primary Examiner*—Jean B. Corrielus
(74) *Attorney, Agent, or Firm*—Gardner Carton & Douglas LLP

(57) ABSTRACT

In order to detect and iteratively decode encoded and interleaved symbols, prior to any iteration, a linear estimation (A) of the transmission channel $\hat{H}_{(z)}^1$ is run on the basis of specific transmitted symbols. Then, by iterations, equalization (B) and decoding (C) process are subjected to an exchange of a priori information ($D_2$) on the symbol bits resulting from the decoding process (C) in the case of the equalization process (B) and on the encoded bits ($D_1$) resulting from the equalization process (B) in the case of the decoding process (C) and an updated iterative re-estimation (G,$E_2$) of the transmission channel is run on the basis of the information resulting from the equalization (B) and decoding (C) process.

16 Claims, 9 Drawing Sheets

OTHER PUBLICATIONS

Lei Wei, "On Bootstrap Iterative Viterbi Algorithm" IEEE International Conference on Communications, vol. 2, Jun. 6-10, 1999, pp. 1187-1191.

W.H. Gerstacker & R. Schober, "Equalisation for EDGE Mobile Communications" Electronics Letters, vol. 36, No. 2, Jan. 20, 2000, pp. 189-191.

Panbong Ha, et al., "Improved Blind Turbo Detector" VTC2000-Spring, vol. 2, May 15-18, 2000, pp. 1196-1199.

Search Report issued by the French Patent Office for parent French Application No. 00 06246 filed on May 16, 2000; report dated Apr. 6, 2001.

* cited by examiner

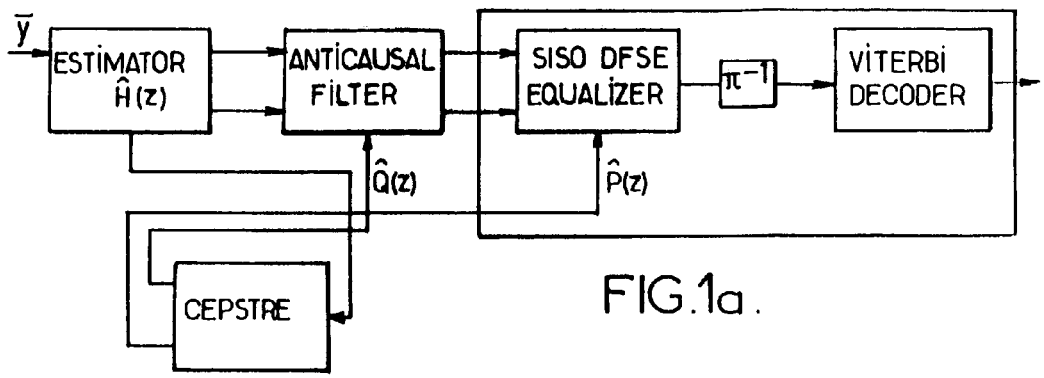
FIG.1a.
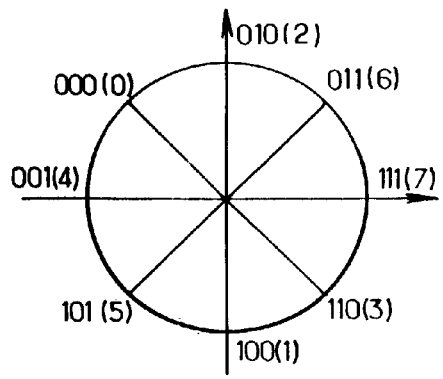
FIG.1b.
(PRIOR ART)
| TAIL<br>3<br>SYMBOLS | DATA<br>57<br>SYMBOLS | LEARNING<br>26 (CAZAC)<br>SYMBOLS | DATA<br>57<br>SYMBOLS | TAIL<br>3<br>SYMBOLS | HOLD<br>9<br>SYMBOLS |
FIG.1c.
(PRIOR ART)

EQUIVALENT DISCRETE MODEL IN BASE BAND

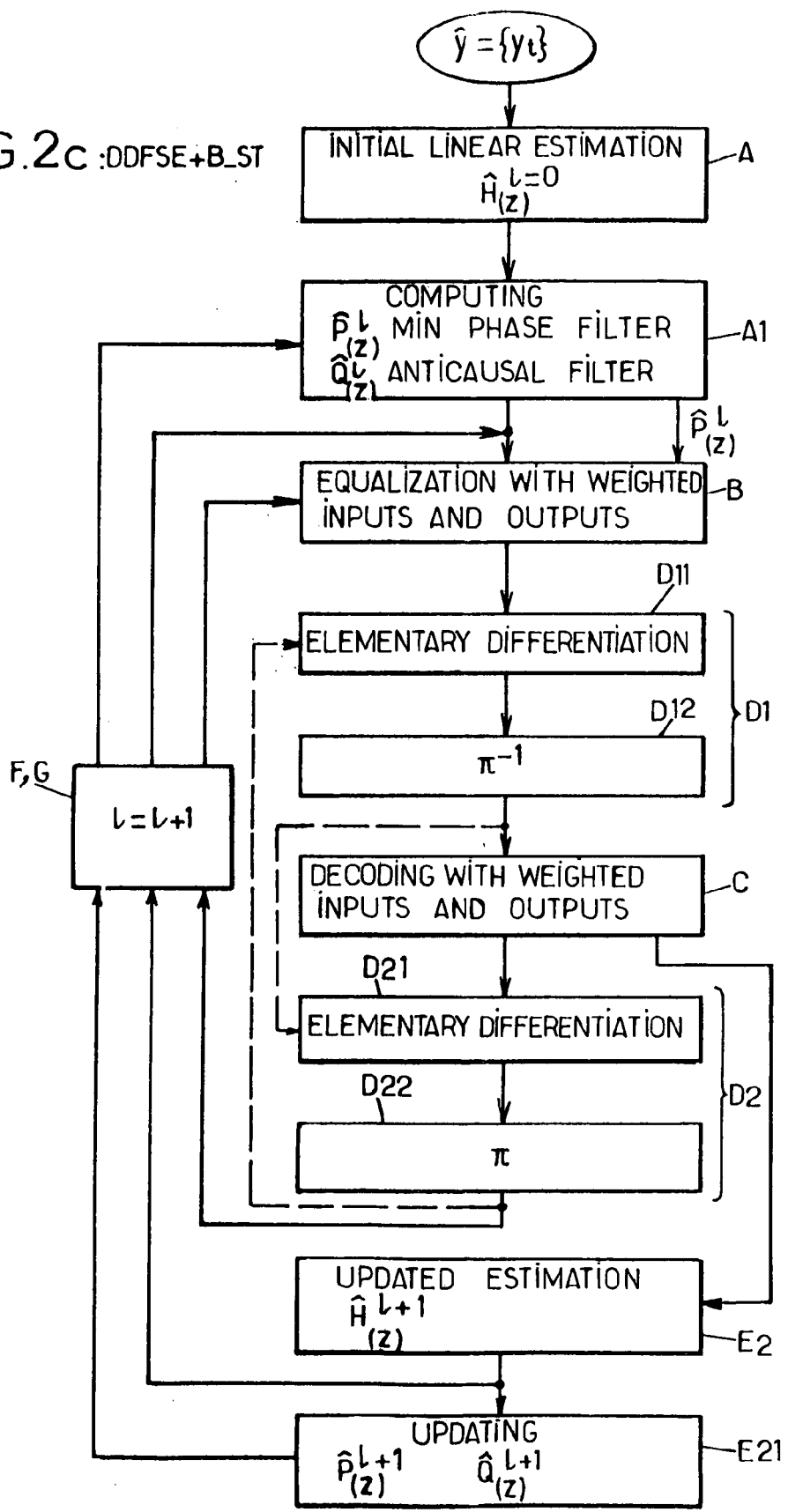
FIG.2c : DDFSE+B_ST

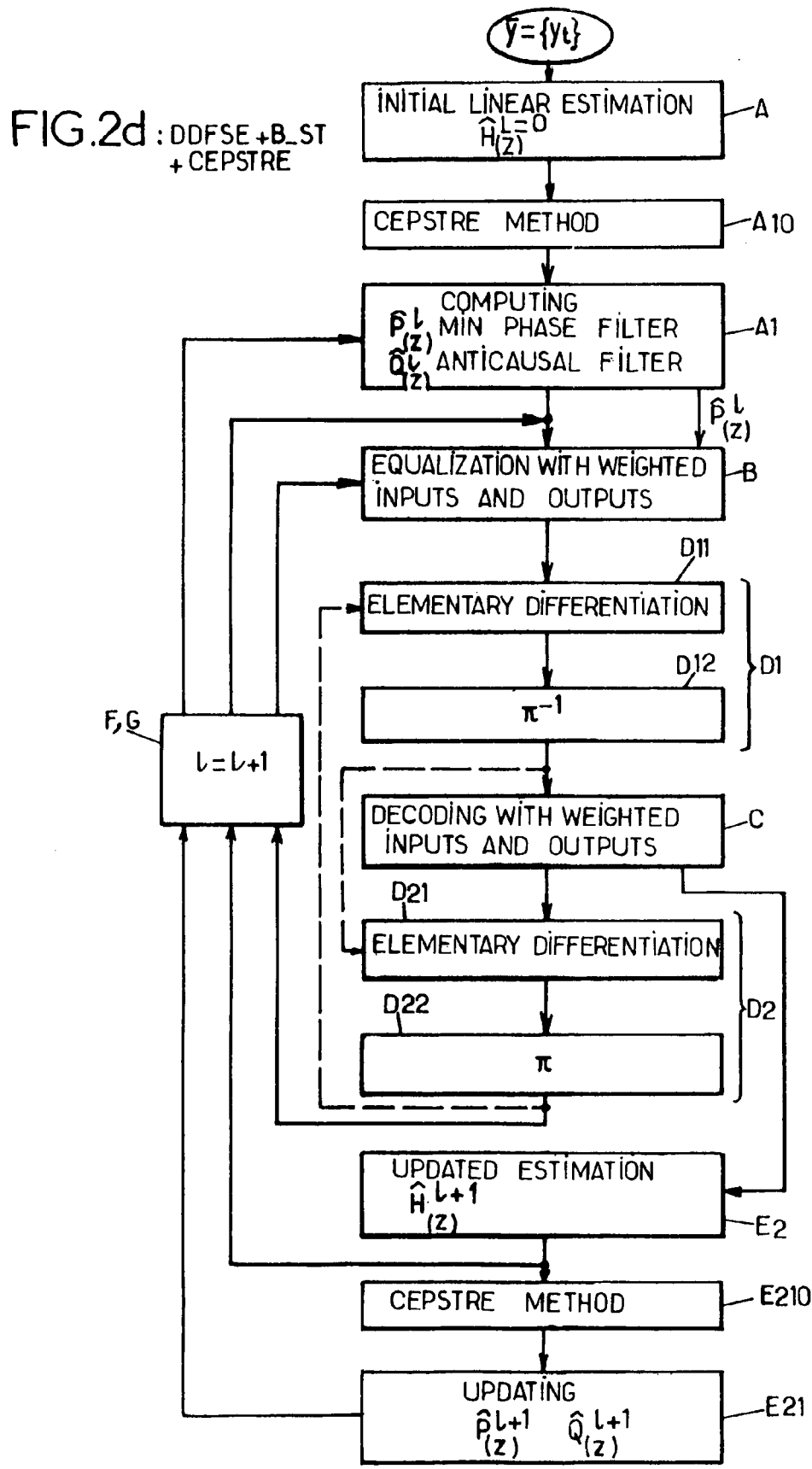

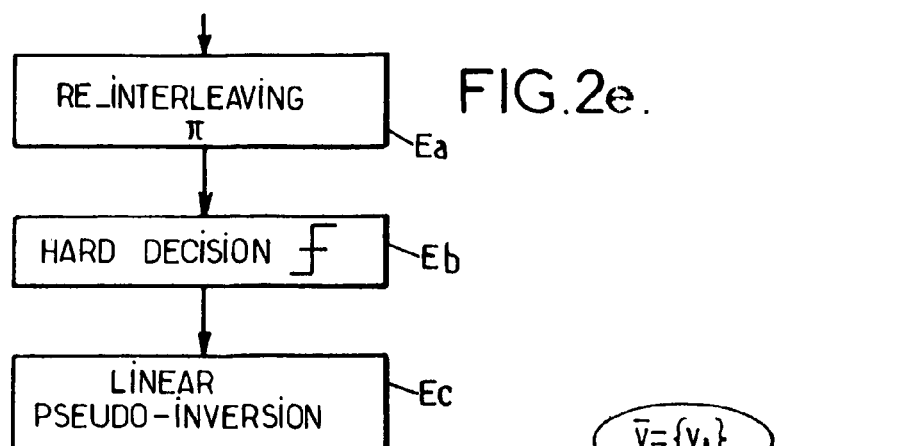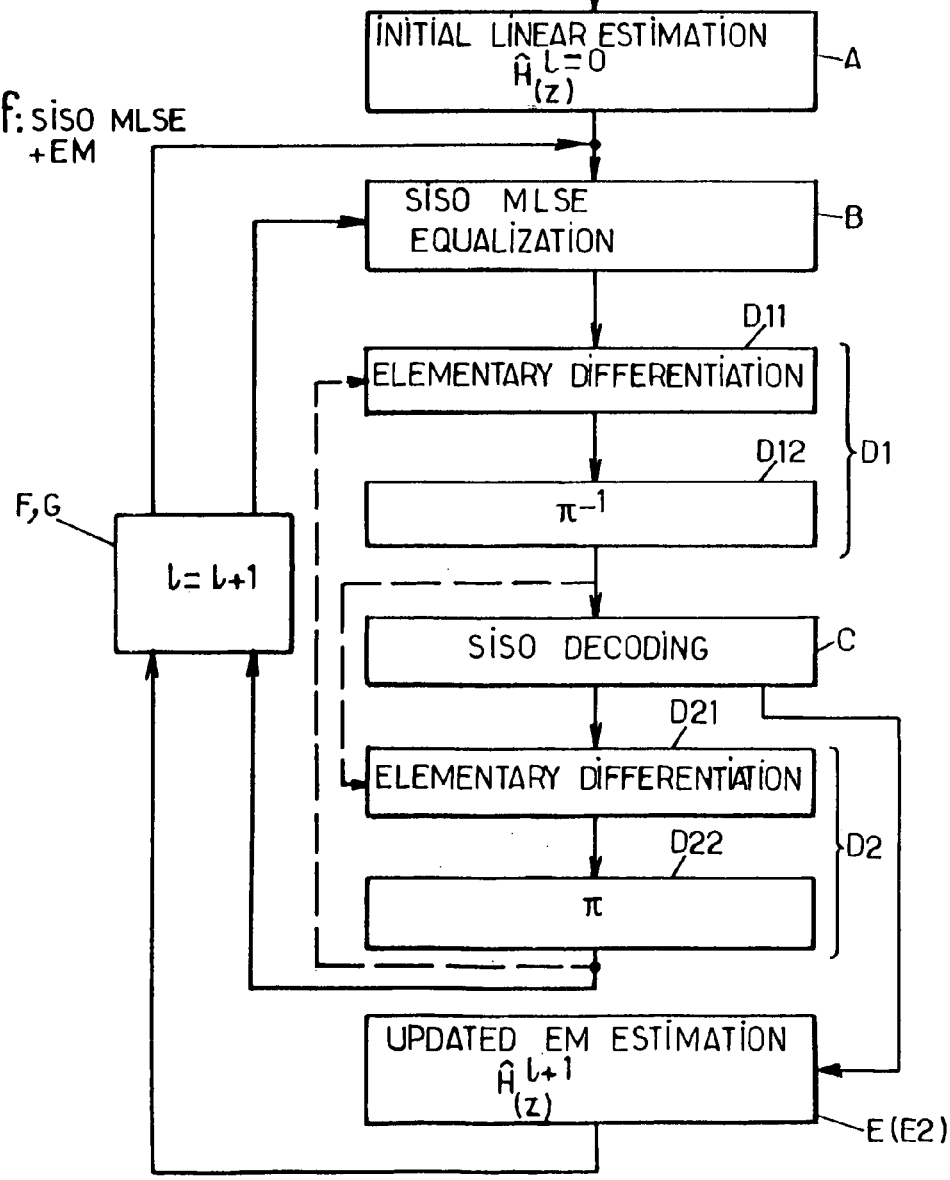

METHOD AND SYSTEM OF ITERATIVELY DETECTING AND DECODING RECEIVED SYMBOLS COUPLED WITH RE-ESTIMATION OF THE COEFFICIENTS OF THE TRANSMISSION CHANNEL

CROSS-REFERENCE TO RELATED APPLICATIONS

This application claims the benefit of the filing date of application no. FR 0006246, filed on May 16, 2000.

BACKGROUND OF THE INVENTION

The invention relates to a method and a system of iteratively detecting and decoding received symbols, coupled with a re-estimation of the coefficients of the transmission channel.

In the field of mobile wireless telephony, it is imperative that the process used to detect and decode transmitted symbols, by channel encoding and modulation of a carrier wave, should take account of the interactions of the transmission channel in order to minimize the effects of the latter and obtain a satisfactory reception quality.

Whilst the transmission channel exhibits radio-electric characteristics during transmission of the symbols and hence a transfer function which is variable over time, the receivers available these days use either a process of optimum detection and decoding, in which case almost perfect equalization of the effects of this transmission channel are obtained, or a process of sub-optimum detection and decoding, whereby an iteration of the detection and decoding method makes it possible to come close to an almost perfect equalization of the effects of the transmission channel.

At present, it has proved almost impossible to use optimum detection and decoding processes because of the very high complexity of the computations needed, particularly in the case of transmission channels with too long a pulse response, as is the case in an urban environment, for example.

The sub-optimum detection and decoding process likely to be used with receivers of the evolved GSM type (EDGE) in current usage is based, for example, on a sub-optimum equalization process known as DDFSE (which stands for Delayed Decision Feedback Sequence Estimator), this process involving the use of pre-filtering, the purpose of which is to place the estimated transmission channel in minimum phase. It will be recalled that a minimum phase transmission channel can be likened to a filter which permits the transmission of time components whose energy is concentrated in the first coefficients of this filter, corresponding to the shortest delays.

For a more detailed description of the DDFSE equalization process, it may be useful to refer to the articles entitled:

"*Delayed Decision-Feedback Sequence Estimation*", published by A. DUEL-HALLEN, C. HEEGARD—IEEE Trans. on Commun., vol. 37, pp. 428–436, May 1989;

"*Filtre correcteur de phase pour égaliseurs sous-optimaux*", published by A. WAUTIER, J. C. DANY, C. MOUROT, Annales de Télécommunications, no. 9–10, 1992.

Referring to the above-mentioned articles, FIG. 1a provides an illustration showing an example of a receiver likely to be used for a DDFSE equalization process with weighted outputs and a convolutional decoder of the Viterbi type. A module which de-interleaves the weighted outputs, denoted by $\Pi^{-1}$, enables account to be taken of the process used to interleave the symbols prior to coding as well as the process used to transmit the latter.

The principle of detection and decoding by iteration, also known as "turbo-detection", was initially proposed by C. DOUILLARD, M. JEZEQUEL, C. BERROU, A. PICART, P. DIDIER, A. GLAVIEUX in an article entitled "*Iterative Correction of Intersequential Interference: Turbo-Equalization*" and published by European Transactions on Telecommunications, vol. 6, pp. 507 to 511, September 1995.

In this detection and decoding method, the equalization process is based on an equalizer of maximum likelihood, with weighted inputs and outputs, referred to as SISO MLSE, whilst the convolutional decoding process used is based on a Viterbi process with weighted inputs and outputs, known as SOVA. The SOVA decoding process was described in a publication entitled "*A Low Complexity Soft Output Viterbi Decoder Architecture*", ICC'93, pp. 733 to 740, Geneva, Switzerland, May 1993.

Since then, there have been extensive developments to the above-mentioned detection and decoding process, which have led to the use of optimum detectors based on maximum a posteriori probability (MAP). For a more detailed description of optimum detectors of these types, reference should be made to the articles entitled:

"*Optimal Decoding of Linear Codes for Minimizing Symbol Error Rate*", published by L. R. BAHL, J. COCKE, F. JELINEK, J. RAVIV, edited by IEEE Transactions on Information Theory, vol. IT-20, pp. 284–287, March 1994;

"*Iterative Equalization and Decoding in Mobile Communications Systems*", published by G. BAUCH, H. KHORRAM, J. HAGENAUER in Proc. EPMCC'97, pp. 307–312, Bonn, Germany, September 1997.

Whereas the turbo-detection process mentioned above effectively cancels out intersymbol interference (ISI) introduced by the effect of the transmission channel, assuming a perfect estimation of the channel coefficients and a sufficient inter-leaving depth of the symbols, an irreversible deterioration of 2.5 to 3 dB nevertheless occurs in the binary error rate if the coefficients of the transmission channel are initially estimated with noise. Reference should be made to the article entitled "*A Comparison of Soft-In-Soft-Out Algorithms for Turbo-Detection*", published by G. BAUCH, V. FRANZ, International Conference on Telecommunications (ICT), vol. 2, pp. 259 to 263, Portos Caras, Greece, June 1998.

Finally, a new method of applying symbol detection and channel decoding methods by iteration, known as the turbo-equalization process and substantially different from the above-mentioned turbo-detection process, was proposed in 1997. Reference should be made to the article entitled "*Turbo-Equalization over Frequency Selective Channel*"—International Symposium on Turbo-Codes, Brest, France, September 1997.

Generally speaking, it may be said that the above-mentioned turbo-equalization process assumes, in essence, a noise estimation of the transmission channel. Although this turbo-equalization process appears promising in the case of modulations with a high spectral efficiency, it nevertheless seems to introduce a deterioration in performance, which is largely dependent on the type of equalization process used for the first iteration, as compared with the turbo-detection process with a noise estimation. Reference should be made to the article entitled "*Joint Equalization and Decoding: Why Choose the Iterative Solution ?*", published by A.

ROUMY, I. FIGALKOW, D. PIREZ, IEEE VTC'1999 Fall, Amsterdam, Netherlands, September 1999.

OBJECTS OF THE INVENTION

The objective of the present invention is to remedy the disadvantages and limitations of the turbo-detection processes known from the prior art by applying a detection and decoding method and system in which the equalization and decoding process is subjected to an iterative process consisting of an exchange of a priori information, firstly on the symbol bits from the decoder in the case of the equalizer and secondly on the encoded bits for the decoder emanating from the equalizer and, in addition, in which the coefficients of the impulse response of the channel are iteratively re-estimated on the basis of the information supplied by this iterative equalization and decoding process.

Accordingly, another object of this invention is to apply an iterative detection and decoding system capable of implementing separate sub-optimum equalization processes, such as the DDFSE or GSOVA processes (Generalized Soft Output Viterbi Algorithm).

Another object of this invention is, additionally, to implement an iterative detection and decoding system capable of running processes for re-estimating the coefficients of the impulse response of the channel by an optimum iterative process or a sub-optimum process of the bootstrap type (linear re-estimation loop).

BRIEF SUMMARY OF THE INVENTION

The method and system for iteratively detecting and decoding encoded and interleaved symbols transmitted on a transmission channel, proposed by the invention, whereby these symbols are transmitted on the basis of a sequence of binary symbols, each symbol sequence received comprising at least specific learning symbols in addition to the data, hold and queue symbols, are remarkable in that this method consists in, being made possible by this system, performing, prior to any iteration, an initial linear estimation of the coefficients of the impulse response of the transmission channel on the basis of specific transmitted learning symbols, then, by iteration, subjecting the equalization and decoding process to an iterative process of exchanging a priori information firstly on the symbol bits emanating from the decoding process in the case of the equalization process and secondly on the encoded bits emanating from the equalization process in the case of the decoding process, and performing an updated iterative re-estimation of the impulse response coefficients of the transmission channel on the basis of the information supplied by the iterative equalization and decoding process. The steps performed by iteration are repeated with the next iteration.

The method and the system proposed by this invention find applications in the field of mobile telephony reception where the channel modulation is a modulation of the GMSK or M-ary type, in particular using GSM and EDGE systems for Enhanced Data Rates for GSM Evolution.

BRIEF DESCRIPTION OF THE DRAWINGS

They will be more readily understood from the following description and with reference to the appended drawings, other than FIGS. 1a to 1d relating to aspects known from the prior art, in which:

FIG. 2c is a specific flow chart, given by way of illustration, showing how the method proposed by the invention is implemented in one particular embodiment in which the equalization process used is a process of the DDFSE type coupled with a re-estimation of the bootstrap type FIG. 2d shows, by way of illustration, another variant of how the method proposed by the invention and illustrated in FIG. 2c is implemented when a CEPSTRUM computing method is used;

FIG. 2e is a specific flow chart, given by way of illustration, showing how an updated re-estimation process of the impulse response coefficients of the transmission channel of the bootstrap type is implemented;

FIG. 2f is a specific flow chart, given by way of illustration, showing how the method proposed by the invention is implemented in a specific embodiment in which the equalization process is a Viterbi process with weighted SISO MLSE inputs coupled with a re-estimation by an iterative EM process;

DETAILED DESCRIPTION OF THE INVENTION

Before moving on to describe the method and system proposed by the invention for iteratively detecting and decoding symbols by re-estimating the transmission channel coefficients, forming the objects of this invention, various reminders will be given below in respect of the prior art in conjunction with FIGS. 1b to 1d.

For a standard receiver of the GSM or EDGE type, the notations associated with the digital communication chain in base band are as follows:

$u=\{u_i\}$ denotes the sequence of binary symbols to be transmitted;

$\bar{c}=\{c_i\}$ denotes the sequence of encoded binary symbols supplied by the channel encoder of the convolutional type, the purpose of the coding channel being to introduce a redundancy into the sequence of bits and symbols transmitted;

$\bar{x}=\{x_i\}$ denotes the sequence of symbols produced after modulation by the modulator, the modulator being a modulator of the M-PSK type and the sequence of symbols being constituted by a sequence of MDP8 symbols, although this is an example and not restrictive in any respect, the modulated sequence of symbols being obtained from the sequence of encoded symbols subjected to interleaving, the interleaving being denoted by Π; it will be recalled that the modulation process outlined above makes a correspondence between a point of the constellation such as illustrated in FIG. 1b and any triplet of consecutive bits which must be subjected to transmission;

$\bar{z}=\{z_i\}$ denotes the sequence of complex symbols in base band associated with each symbol issued by the PSK modulator, with each sequence of MPD8 symbols, written $x$, corresponding to the complex symbol sequence $z$.

It will be recalled that the coded sequences emitted are of a binary length m×114×3, tail-bits included. After channel interleaving, operation Π, the sequences are broken up into m packets of symbols of the EDGE or GSM type, each packet being made up of 114 MDP8 payload symbols to which 26 symbols of the learning sequence are added, in general symbols of the CAZAC type, 6 tail symbols divided into two times 3 tail symbols, and 9 hold symbols, as illustrated in FIG. 1c.

Figure 1D:
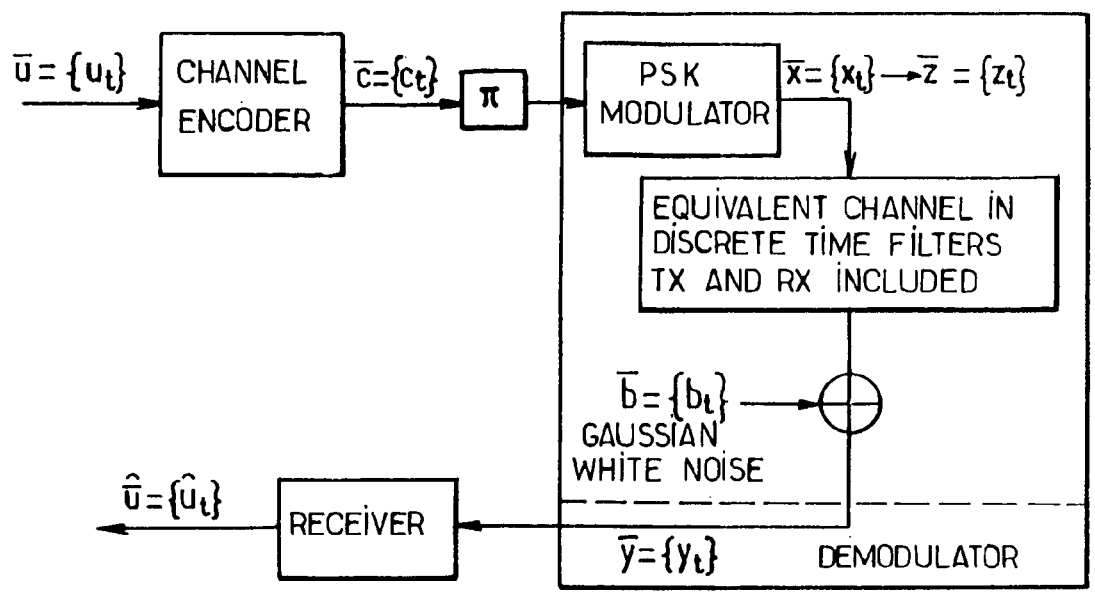

FIG. 1d shows the equivalent discrete model in base band for transmitting the packets of EDGE or GSM symbols mentioned above.

The above-mentioned packets of symbols are filtered by the linearized GMSK impulse response and the corresponding signal is then transmitted on the frequency radio-selective channel, which can be modeled by an equivalent Rayleigh multi-path channel. In FIG. 1d, the equivalent channel in discrete time is known to comprise the filters $T_x$ and $R_x$. Furthermore, a Gaussian white noise with a constant spectral density on the band occupied by the transmission filter must be taken into account. The reception filter of the demodulator is a filter with a roll-off Nyquist root (coefficient relating to the spectral occupancy) α=0.5. The demodulator synchronizes and decimates the received over-sampled signal received with the time symbol.

The equivalent model in discrete time (symbol) illustrated in FIG. 1d is such that the demodulator issues a series of samples, written $\bar{y}=\{y_t\}$, it also being possible to write the issued samples $y_t$ in the form of a discrete convolution, based on the equation:

$$y_t = \sum_{j=0}^{K_{ch}-1} h_j z_{t-j} + b_t$$

In this equation:
{$h_j$}$_j$ denotes the complex coefficients of the equivalent discrete channel corresponding to the convolution of the transmission filter of the channel and the reception filter;

$\bar{z}=\{z_t\}$ denotes the sequence of symbols issued by the MDP8 modulator before filtering, in their complex form;

$K_{ch}$ denotes the constraining length of the equivalent discrete channel;

$b_t$ denotes a Gaussian white noise sample, the filtering by Nyquist root guaranteeing the whitening operation.

A more detailed description of the iterative method of detecting and decoding received symbols coupled with a re-estimation of coefficients of the transmission channel as proposed by the invention will now be given in conjunction with FIG. 2a.

Generally speaking, it will be recalled that the symbols are transmitted on the basis of a sequence of binary symbols, each sequence of received symbols thus being encoded and interleaved and comprising at least specific learning symbols as illustrated in FIG. 1c, in addition to the data, hold and tail symbols.

Figure 2B:
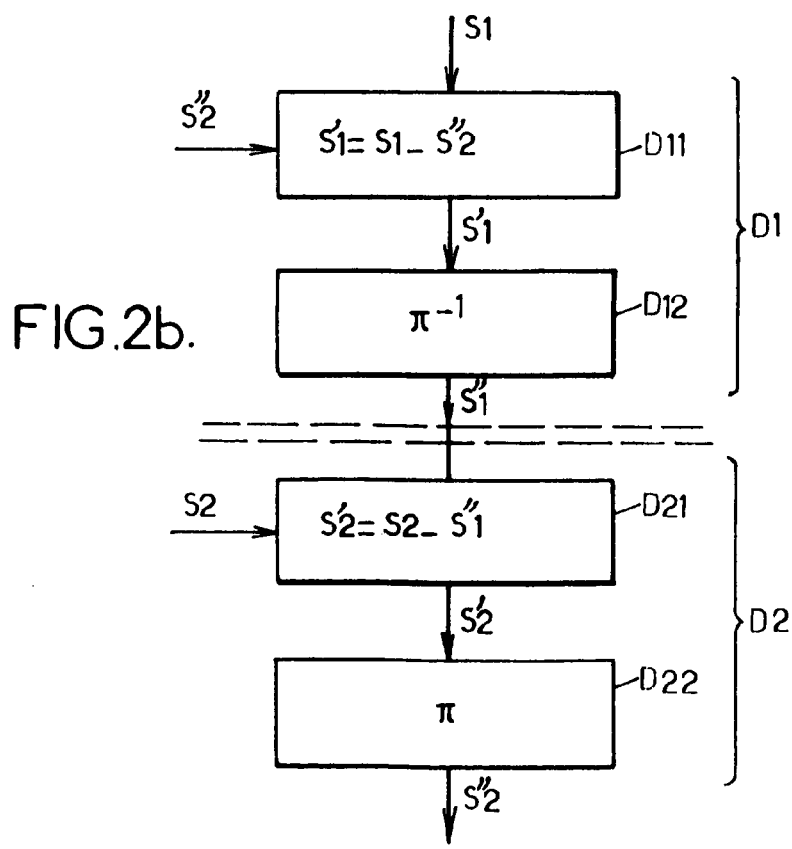
FIG. 2b is a specific flow chart, given by way of illustration, showing how a priori information is exchanged between equalization and decoding processes and vice versa.
Figure 2A:
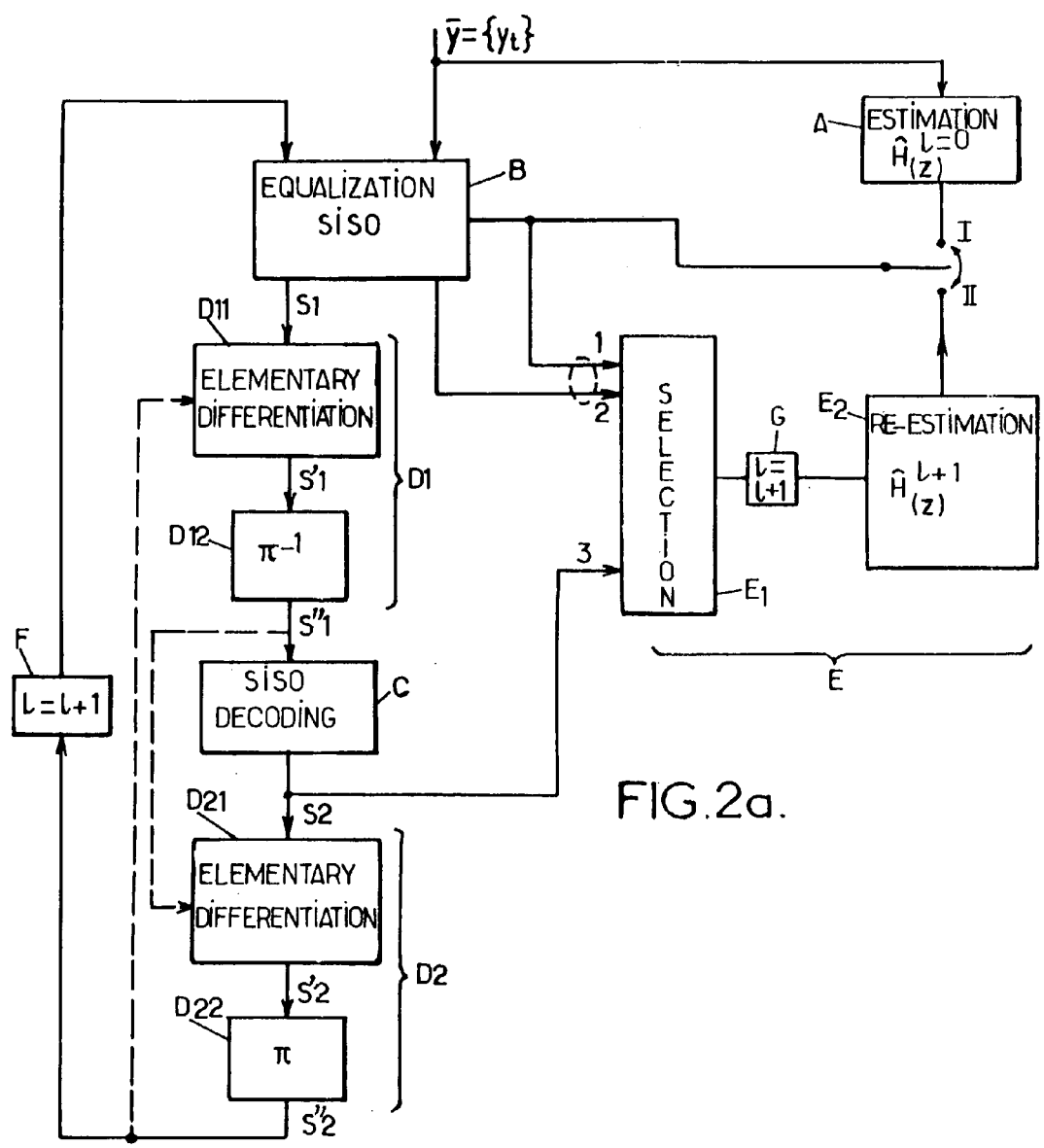
FIG. 2a shows, by way of illustration, a general flow chart of the steps enabling the method proposed by the invention to be implemented.

Turning to FIG. 2a, prior to any iteration, the method proposed by the invention consists in performing, at a step A, an initial linear estimation of the coefficients of the impulse response of the transmission channel $\hat{H}_{(z)}^{l=0}$ on the basis of the specific learning symbols transmitted.

The initial estimation operation A illustrated in FIG. 2a corresponds, from the point of view of transmitting data supplied by the estimation, to a switching point I for transmitting these data to the equalization process. Accordingly, the estimate is made on the basis of the sequence of received symbols $\bar{y}$ destined for the receiver. Since the learning symbols, CAZAC symbols, are known as such, it is therefore possible to determine coefficients of the impulse response of the transmission by a linear estimation prior to any iteration, using a comparison between the symbols known on transmission and the CAZAC sequence incorporated in the transmitted symbol packets and the corresponding symbols and packets of symbols received. For this reason, the initial linear estimation operation is written $\hat{H}_{(z)}^{l=0}$.

Following the above-mentioned initial estimation operation, the method proposed by the invention consists in subjecting the equalization and decoding process to an iterative process of exchanging a priori information between these two processes.

In FIG. 2a, the equalization process is denoted by B and the decoding process is denoted by C.

Generally speaking, it should be pointed out that the equalization process and the decoding process, shown by references B and C, are equalization and decoding processes with weighted inputs and outputs, which is why they are referred to as SISO equalization and SISO decoding, standing for Soft-Input Soft-Output equalization and Soft-Input Soft-Output decoding respectively.

More specifically, it should be pointed out that different SISO equalization processes and SISO decoding processes respectively may be used without departing from the scope within which the object of the invention is implemented.

Generally speaking, the iterative process of exchanging a priori information is operated firstly on the symbol bits symbol bits emanating from the decoding process in the case of the equalization process and secondly on the encoded bits in the case of decoding, the encoded bits emanating from the equalization process.

This double exchange of a priori information is illustrated by the arrows shown in broken lines in FIG. 2a and will be explained in more detail later on in this description.

The iterative process of exchanging a priori information consists in differentiating between the contribution of the transmission channel and the contribution of decoding in obtaining the above-mentioned a priori information. The corresponding differentiation operations are denoted by $D_1$ and $D_2$ respectively in FIG. 2a.

Finally, and as part of the above-mentioned iteration, the method proposed by the invention also consists in an updated iterative re-estimation of the coefficients of the impulse response of the transmission channel at step E on the basis of the information supplied by the iterative equalization and decoding process.

In order to perform this updated iterative re-estimation of the coefficients of the impulse response of the transmission channel, the information supplied by the iterative equalization and decoding process may be subjected to a selection operation $E_1$, followed by an actual re-estimation operation $E_2$, the actual re-estimation consisting in re-estimating the coefficients of the impulse response of the transmission channel $\hat{H}_{(z)}^{l+1}$ for each iteration of rank l+1. For this iteration operation, the data obtained from the actual re-estimation at step $E_2$ is switched at 1,2 illustrated in FIG. 2a or 3, depending on the circumstances, in order to enable the SISO equalization process to be performed at step B on the basis of this new, re-estimated data.

As regards the updated iterative re-estimation process on the basis of the information supplied by the iterative equalization B and decoding C process, the different embodiments will be described later on in the description, corresponding to the selection positions 1,2 and 3 in FIG. 2a. These modes for selecting re-estimation input data depend firstly on the type of equalization used and secondly on the type of re-estimation used, as will be explained later on in the description.

The iterative nature of the exchange of a priori information between the equalization process B and the decoding process C is illustrated firstly by step F where there is a shift from iteration l to iteration l+1, and the iterative nature of the iterative re-estimation E is represented secondly by step G where there is a shift from iteration l to iteration l+1.

A more detailed description of a specific way of implementing an iterative process of exchanging a priori information between equalization process and decoding process B, C, will now be described in conjunction with FIG. 2b. This embodiment may be implemented irrespective of the equalization and decoding process used, as will be explained in the description.

As illustrated in FIG. 2b mentioned above, the iterative process of exchanging a priori information consists in differentiating between the contribution of the transmission channel and the contribution of decoding. This differentiation consists firstly of a differentiation process $D_1$ in which the a priori information $S''_2$ on the symbol bits is extracted from the weighted output sequence on equalized symbol bits, this sequence being written $S_1$, obtained from the equalization process B, in order to generate an extrinsic sequence or information denoted by $S'_1$.

The extrinsic sequence $S'_1$ is then subjected to a de-interleaving process denoted by $\Pi^{-1}$ to generate a weighted input sequence, written $S''_1$, containing the information from the channel and the a priori information on the encoded bits from the equalization. In FIGS. 2a and 2b, the subtraction shown by the elementary differentiation step is written as $D_{11}$. The de-interleaving step is shown by $D_{12}$.

Furthermore, the iterative process of exchanging a priori information consists, at a differentiation step $D_2$, in subtracting from the weighted output sequence on decoded bits $S_2$, obtained from the SISO decoding process C, the weighted input sequence $S''_1$ at the input of the decoding process C in order to generate an extrinsic information sequence on decoded bits, shown by $S'_2$. The above-mentioned subtraction step corresponding to an elementary differentiation step is shown by reference $D_{21}$ in FIG. 2b and FIG. 2a.

The extrinsic information sequence on decoded bits $S'_2$ is then put through a de-interleaving process in order to generate the a priori information $S''_2$ on the symbol bits mentioned earlier in the description, this de-interleaving step Π being shown by reference $D_{22}$ in FIG. 2a and FIG. 2b.

The method of iteratively detecting and decoding encoded and interleaved symbols proposed by this invention can be implemented using different specific equalization processes and different re-estimation processes, which will be described farther on in the description. As far as the channel code used is concerned, it may be a convolutional code or a combination of linear, serial, parallel or hybrid codes. As for the decoding process, any decoding process capable of handling the encoding process may be used. Decoding may itself be iterative.

Generally speaking, as illustrated in FIG. 2c, the equalization process may consist of a DDFSE process with weighted inputs/outputs coupled with a re-estimation of the bootstrap type, B-ST.

In FIG. 2c, the same steps as those used in FIG. 2a are shown by the same references.

With regard to the approach to implementing the method proposed by the invention illustrated in FIG. 2c, the equalization process is a process of the DDFSE type in which a single survivor per node is retained.

Under these conditions, the method proposed by the invention also consists, prior to any iteration, in computing at a step $A_1$, using the initial linear estimation obtained at step A for the coefficients of the impulse response of the transmission channel, a minimum phase filter $P_{(z)}^1$ and an anticausal filter $Q_{(z)}^1$ respectively, the minimum phase and anticausal filters satisfying the equation:

$$\hat{H}_{(z)}^1 * Q_{(z)}^1 = P_{(z)}^1$$

Prior to any iteration, the filter $P_{(Z)}^{l=0}$ is defined as being a transmission channel with an initial minimum phase.

Furthermore, the method proposed by the invention and illustrated in FIG. 2c consists in subjecting the sequence of received symbols to the equalization process, by iteration, conditionally at the values of the minimum phase filter $P_{(Z)}^1$ defined as being a successive minimum phase transmission channel for the running iteration, i.e. the iteration of rank l=l+1 successively.

The method proposed by the invention also consists in using the updated linear estimation $\hat{H}_{(z)}^{l+1}$ for the next iteration to update the minimum phase filter $P_{(z)}^{l+1}$ defined as being a successive minimum phase transmission channel and the anticausal filter $Q_{(z)}^{l+1}$ associated with the latter.

The operation of updating the minimum phase filters $P_{(z)}^{l+1}$ and $Q_{(z)}^{l+1}$ is illustrated at step $E_{21}$ of FIG. 2c.

The iterative nature of this iteration is illustrated by step G, for which l=l+1, whilst the iterative nature of the process of estimating the coefficients of the impulse response of the transmission channel firstly and the exchange of a priori information between the equalization and decoding processes B, C, is also shown by the same operation denoted by step F.

As regards implementing steps $A_1$ at which the minimum phase filter and the anticausal filter are computed and the respective values of these filters are updated at step $E_{21}$ shown in FIG. 2c, it should be pointed out that these computing steps are performed by the CEPSTRUM method, which will be described in more detail later on in the description, this computing method consisting, as illustrated in FIG. 2d, of a step $A_{10}$ and a step $E_{210}$ respectively, at which a specific computing mode is used, based on a fast Fourier transform with 256 coefficients, for example.

Step E, which involves running an updated estimation of the coefficients of the impulse response of the transmission channel for the next iteration, and particularly in the case of a process of the bootstrap type mentioned earlier, consists, as illustrated in FIG. 2e, in subjecting the weighted output sequence on decoded bits, i.e. at the output of the decoding process, to a de-interleaving process, denoted by $E_a$, then subjecting the re-interleaved, weighted output sequence flow obtained from step $E_a$ to a hard decision to re-constitute the symbols received, this operation being denoted by $E_b$ in said FIG. 2e, and, finally, subjecting the reconstituted received symbols to a linear pseudo-inversion process across all the reconstituted received symbols, this operation being denoted by $E_c$ in FIG. 2e.

The implementing method proposed by the invention is not restricted to an equalization process of the DDFSE described above in conjunction with FIGS. 2c to 2e.

In practice, as part of implementing a re-estimation of the bootstrap type, it is also possible to use an equalization process other than the DDFSE process. A different equalization process may therefore be used such as the process known as GSOVA, which stands for Generalized Soft Viterbi Algorithm, consisting of a DFSE process in which more than one survivor is retained per node.

This technique is an effective way of combating error propagation, which is generally known to occur with the DDFSE type process and which, for this reason, requires the use of an appropriate filter to whiten the signal.

The GSOVA process does not require the introduction of such filtering but nevertheless has a major disadvantage in that it does not lend itself to a computation of the "forward backward" type for computing soft outputs in the weighted output equalization process. However, other computing processes may be used to compute the above-mentioned weighted outputs, these computing processes requiring only a single "forward" passage, for example the SOVA process.

To obtain a description of the GVA process, the Generalized Viterbi Algorithm and GSOVA, reference may be made respectively to the publications entitled *A List-type reduced Constraint Generalization of the Viterbi Algorithm*" published by T. HASHIMOTO, IEEE Trans. Info Theory vol. 33, pp. 866–876, November 1987, and the publication entitled "*A Viterbi Algorithm with soft Decision Outputs and its Applications*", published by J. HAGUENAUER and P. HOEHER, Globcom 89, Dallas, USA, pp. 1680–1686.

Finally, it should be pointed out that the step consisting in running an updated estimation of the coefficients of the impulse response of the transmission channel for the next iteration may consist in performing an iteration of the EM type, which stands for Expectation Maximization, using the a posteriori probabilities on the trellis states associated with Markov's model of the ISI transmission channel produced by the equalization process of the running iteration, as well as the estimated current value of the coefficients of the impulse response of the transmission channel $\hat{H}_{(z)}^{-1}$. For a more detailed description of the iteration of the EM type, reference may be made to the article entitled "*SEMIBLIND MAXIMUM A POSTERIORI MULTIPATH FAST FADING CHANNEL ESTIMATION FOR TDMA SYSTEMS*" published by Mohamed SIALA, Rafael BRU GIBERT, IEEE VTS, 50th Vehicular Technology Conference, Amsterdam, The Netherlands, Sep. 19–22, 1999.

In particular, said updated estimation, produced by EM iteration and the use of a posteriori probabilities on the trellis states obtained by the equalization process in the running iteration and the running estimated value of the coefficients of the impulse response of the transmission channel, advantageously corresponds to the selection at positions 1,2 in FIG. 2a, whilst implementing the updated estimation step of the impulse response coefficients of the transmission channel by the process of the bootstrap type, for example, corresponds to the selection at position 3 in the same FIG. 2a.

A more detailed description of how a system of iterative detection and decoding of encoded and interleaved symbols on a transmission channel is implemented, coupled with a process of re-estimating the coefficients of this channel, will now be given in conjunction with FIGS. 3a to 3d and the subsequent drawings.

Figure 3A:
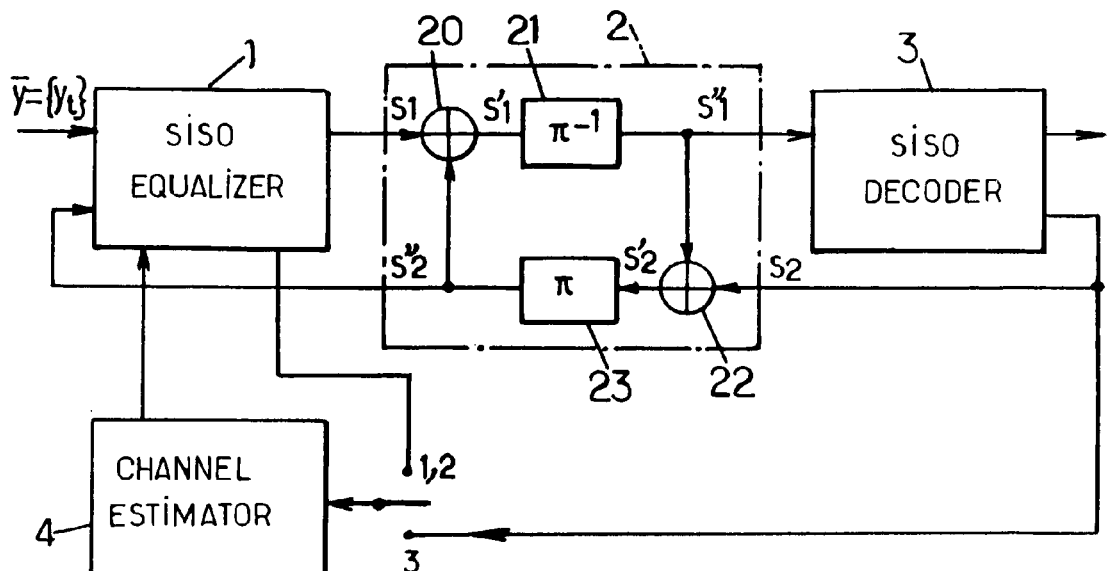
FIG. 3a is an operating diagram, given by way of illustration, showing how a system as proposed by the invention is implemented.

Turning to FIG. 3a, the system proposed by the invention receives the sequence of received symbols, denoted by $\underline{y} = \{y_t\}$. The sequence of received symbols conforms to the format explained earlier in the description and made up of packets of symbols such as those illustrated in FIG. 1c.

As may be seen from FIG. 3a, the system proposed by the invention comprises an equalization module 1 with soft inputs and outputs, denoted by SISO, receiving the sequence of received symbols and emitting a sequence of weighted outputs on equalized symbol bits, denoted by $S_1$.

The system proposed by the invention also comprises a module 2 for computing and exchanging a priori information, this a priori information being computed firstly on the symbol bits of decoded symbol bits, i.e. on a sequence $S_2$ emanating from the decoding process, this a priori information being destined for the equalization process and issued in a sequence $S''_2$ at the input of said equalization module 1 with soft inputs and outputs. Secondly, the module for computing and exchanging a priori information enables a priori information to be computed on the encoded bits, in a sequence $S''_1$, representative of this a priori information from the equalized symbol bits, i.e. from the sequence $S_1$, the a priori information on encoded bits $S''_1$ being destined for the decoding process and emitted as an input variable for said decoding process.

Finally, the system proposed by the invention as illustrated in FIG. 3a also has a decoding module 3 with soft inputs and outputs, shown as a SISO decoder, receiving the a priori information represented by the sequence $S''_1$, on the encoded bits and issuing the sequence of weighted outputs on decoded bits, represented by $S_2$, obtained from the decoding process and therefore emitted by the decoding module 3 with soft inputs and outputs.

Finally, the system proposed by the invention advantageously has a module 4 for producing an updated iterative estimation of the coefficients of the impulse response of the transmission channel based on the information obtained from the iterative equalization and decoding process.

It should be pointed out in particular that the module 4 for producing an updated iterative estimation of the coefficients of the impulse response of the transmission channel receives information from the equalizer module 1 or the decoder module 3 depending respectively on the selection and choice of the type of equalizer and decoder with weighted inputs/outputs used, this selection corresponding to positions 1, 2, and 3 respectively of FIG. 2a and symbolically represented in said FIG. 3a by a switching element between the positions mentioned above.

In terms of how the system proposed by the invention operates, a priori information computed and exchanged on the encoded bits represented in sequence S"$_1$ applied to the input of the SISO decoder module bearing reference 3 and a priori information on the symbol bits represented by sequence S"$_2$ applied to the input of the SISO equalizer module 1 SISO from the decoded bits emanating from the decoder module 3 improves performance, firstly of the SISO equalizer module SISO 1 and, secondly, of the SISO decoder module SISO 3. This improvement is obtained in particular due to the iteration process coupled with the re-estimation of the coefficients of the impulse response of the transmission channel on the basis of the information obtained from the iterative equalization and decoding process, under the specific conditions respectively inherent in the chosen type of equalization process and SISO equalizer module as well as the decoding process and SISO decoder module 3 finally selected to implement the method and device proposed by the invention. Clearly, the type of process and updated iterative estimation of the coefficients of the impulse response of the transmission channel is linked to the type of equalizer module and SISO decoder module respectively chosen.

A preferred but not restrictive approach to operating the module 2 used to compute and iteratively exchange a priori information will now be given in conjunction with the same FIG. 3a.

As illustrated in said drawing, the module 2 for computing and iteratively exchanging a priori information may advantageously have a first module 20 for subtracting from the sequence of weighted outputs on equalized symbol bits $S_1$ emanating from the SISO equalizer module 1 a priori information S"$_2$ about the symbol bits resulting from the decoding process, the first subtracting module 20 enabling an extrinsic sequence, denoted by S'$_1$, to be generated, this extrinsic sequence in effect corresponding to potential a priori information emanating from the equalized symbol bits. In effect, the sequence S'$_1$ represents this potential a priori information due to the interleaving process applied on emission of the sequence of symbol bits transmitted and finally received.

The module 2 for computing and iteratively exchanging information also has a module 21 for de-interleaving the extrinsic sequence S'$_1$ representing said potential a priori information, the de-interleaving module 21, represented by $\Pi^{-1}$, enabling the sequence of weighted inputs S"$_1$ containing the information from the channel and the a priori information on the encoded bits from the equalization process to be generated.

In addition, the module 2 for computing and iteratively exchanging information has a second module 22 for subtracting from the sequence of weighted outputs on decoded bits $S_2$ issued by the SISO decoder 3 said sequence of weighted inputs S"$_1$, the second subtraction module 22 enabling a sequence of extrinsic information on decoded bits, represented by S'$_2$, to be generated, which represents a priori information on decoded bits taking account of the de-interleaving process needed for the decoding operation.

Finally, the module 2 for computing and iteratively exchanging a priori information has a de-interleaving module 23, shown by $\Pi$, receiving the sequence of extrinsic information S'$_2$ on decoded bits and enabling the a priori information S"$_2$ on the symbol bits to be generated, which is applied firstly to the SISO equalizer module 1 and secondly, of course, in a loop to the first subtraction module 20.

In the case of the embodiment of the module 2 for computing and iteratively exchanging a priori information illustrated in FIG. 3a, the computed a priori information represented by the sequences S"$_1$, respectively S"$_2$ applied to the SISO decoder module and the SISO equalizer module is symmetrical and any iteration performed on the computation of said a priori information finally enhances and refines the performance of whichever equalizer 1 and SISO decoder 3 are finally chosen.

Figure 3B:
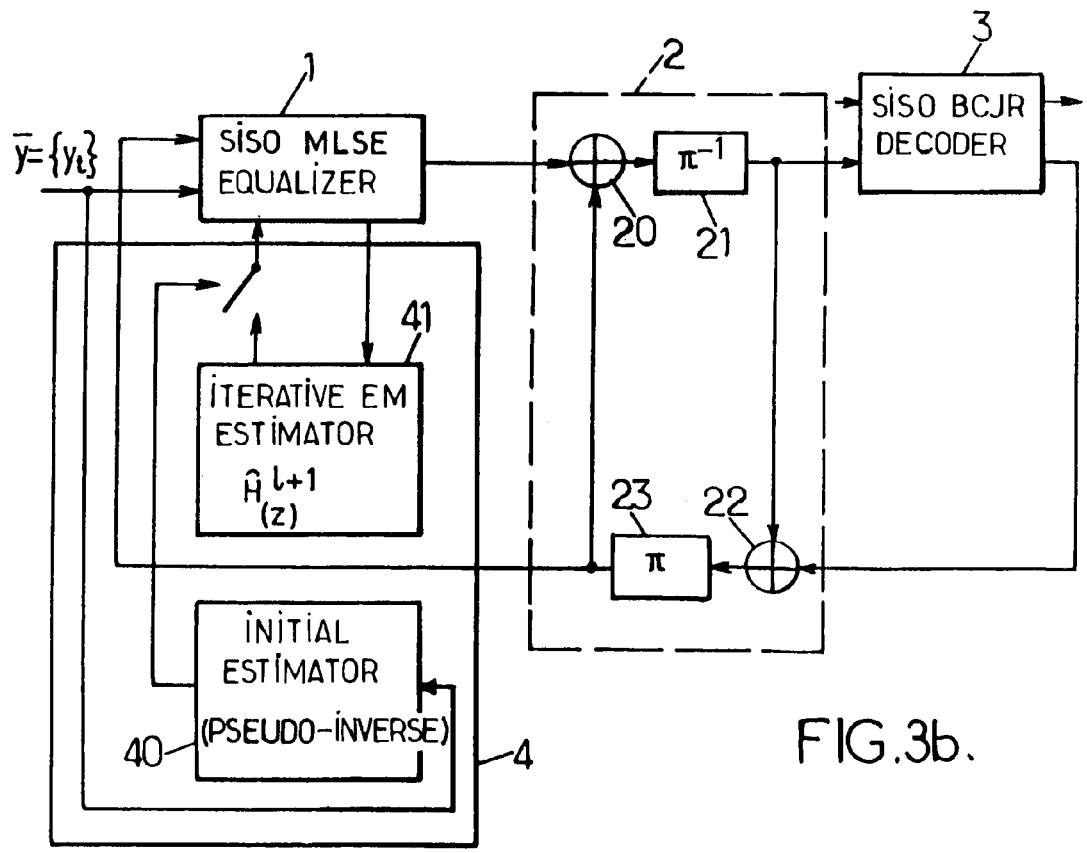
FIG. 3b shows, by way of illustration, a first variant of the system proposed by the invention and illustrated in FIG. 3a, specifically implemented in the situation where the SISO equalizer is a SISO MLSE equalizer, the SISO decoder is a SISO BCJR decoder and the iterative channel estimator is an iterative EM estimator.

A first specific implementing method used with a system of the type proposed by the invention will now be described in conjunction with FIG. 3b, although this is not restrictive, in the situation where, firstly, the SISO equalizer module 1 is a MLSE equalizer module with soft inputs/outputs and the SISO decoder module 3 is a BCJR decoder module with soft inputs/outputs and where the module 4 performing the updated iterative estimation comprises a module 40 for running an initial estimation of the coefficients of the impulse response of the transmission channel as well as a module 41 for performing an updated iterative estimation of the EM type, in order to obtain Expectation Maximization of the coefficients of the impulse response of the transmission channel.

As for the equalizer module 1, it may be an equalizer module of the MLSE type with weighted outputs and inputs and hence of the SISO type.

Under these conditions, the equivalent discrete channel, such as that illustrated in FIG. 1d but taking account of the chosen equalizer module and decoder module, may be seen as a non-systematic, non-recursive convolutional code, varying over time, and of a constraint length $K_{ch}$, this constraint length representing the number of coefficients of the discrete channel.

Under these conditions, the corresponding discrete channel generating intersymbol interference ISI is associated with a regular trellis associated with the Markov model of this channel, this trellis being represented by $T_{ch}(S,B,\Theta)$. Each branch or transition b∈B of this trellis at a time section t comprises three fields:

the initial state s'∈S the state on arrival s∈S;

an incoming binary sequence, written $\overline{\Theta}^{(b)} = \{x_{(t,i)}\}_{i \in [1, log 2M]}$ represented by an integer, being a modulation symbol.

For a running iteration of rank 1 and conditional on an estimate $\hat{H}_{(z)}^{(l)}$ of the coefficients of the transmission channel, the maximum likelihood equalizer module with weighted inputs and outputs 1 of the SISO MLSE type computes an approximate ratio of a priori probabilities on each bit of each symbol of the M-ary modulation type, verifying equation (1)

$$L_{soft}^{(l)}(x_{t,i}) = \ln\frac{Pr\{x_{t,i}=1|\overline{y}; \hat{H}_{(z)}^{(l)}\}}{Pr\{x_{t,i}=0|\overline{y}; \hat{H}_{(z)}^{(l)}\}} = \ln\frac{\max_{b \in B, \vartheta_i^{(b)}=1} Pr\{b, \overline{y}; \hat{H}_{(z)}^{(l)}\}}{\max_{b \in B, \vartheta_i^{(b)}=0} Pr\{b, \overline{y}; \hat{H}_{(z)}^{(l)}\}} \quad (1)$$

In this equation, $\overline{y}$ represents the complex sequence of received symbols having a length $\tau_{ch}$ and Pr<.|.> represents the probability conditional on knowing the received symbols and the channel parameters.

Any inherent probability $$Pr(b, \bar{y}; \hat{H}_{(z)}^{(l)})$$

associated with the transition $b=(s_{l-1}=s', \overline{\Theta}^{(b)}, s_l=s)$ may be broken down into a product of three densities of probabilities, in accordance with the equation (2):

$$Pr(b, \bar{y}; \hat{H}_{(z)}^{(l)}) \propto \alpha_{l-1}(s'; \hat{H}_{(z)}^{(l)}) \gamma_l(s, s'; \hat{H}_{(z)}^{(l)}) \beta_l(s; \hat{H}_{(z)}^{(l)}) \quad (2)$$

where:

$$\alpha_l(s; \hat{H}_{(z)}^{(l)}) = p(s_l = s, \bar{y}_{l \to 1}; \hat{H}_{(z)}^{(l)})$$

$$\beta_l(s; \hat{H}_{(z)}^{(l)}) = p\langle \bar{y}_{l+1 \to \tau c} | s_l = s; \hat{H}_{(z)}^{(l)} \rangle$$

$$\gamma_l(s, s'; \hat{H}_{(z)}^{(l)}) = p\langle s_l = s, y_l | s_{l-1} = s'; \hat{H}_{(z)}^{(l)} \rangle$$

The SISO MLSE equalizer module 1 then computes the other probability densities $\alpha_{l-1}(s'; \hat{H}_{(z)}^{(l)})$ et $$\alpha_{l-1}(s'; \hat{H}_{(z)}^{(l)}) \text{ et } \beta_l(s; \hat{H}_{(z)}^{(l)})$$

recursively, using a double forward-backward recursion in accordance with equation (3):

$$\alpha_l(s; \hat{H}_{(z)}^{(l)}) = \max_{s' \in S} \gamma_l(s, s'; \hat{H}_{(z)}^{(l)}) \alpha_{l-1}(s'; \hat{H}_{(z)}^{(l)}) \quad (3)$$

$$\beta_l(s; \hat{H}_{(z)}^{(l)}) = \max_{s' \in S} \gamma_{l+1}(s', s; \hat{H}_{(z)}^{(l)}) \beta_{l+1}(s'; \hat{H}_{(z)}^{(l)})$$

For the existing transitions, the metrics are then expressed as given by equation (4)

$$\gamma_l(s, s'; \hat{H}_{(z)}^{(l)}) = p\langle y_l | s, s'; \hat{H}_{(z)}^{(l)} \rangle Pr(s|s') \quad (4)$$

$$p\langle y_l | s, s'; \hat{H}_{(z)}^{(l)} \rangle =$$

$$p\langle y_l | \Psi(\overline{\partial}^{(b)}); \hat{H}_{(z)}^{(l)} \rangle \propto \exp\left(-\frac{1}{2\sigma^2} \|y_1 - \hat{h}_0^{(1)} z_l - \hat{I}_l\|^2\right)$$

where:

$\hat{H}_{(z)}^{(l)}$ denotes the estimate of the channel at iteration $\tau$;

$$z_l = \Psi(\overline{\partial}^{(b)})$$

is the complex associated with the M-ary symbol number $\overline{\Theta}^{(b)}$ carried by branch b;

$\hat{I}_l$ is the ISI term:

$$\hat{I}_l = \sum_{j=1}^{K_{ch}-1} \hat{h}_j^{(l)} \Psi(x_{l-j}) = \sum_{j=1}^{K_{ch}-1} \hat{h}_j^{(l)} z_{l-j}$$

$\sigma^2$ represents the noise variance.

In equation (4) given above, the term $\hat{I}_l$ representing the intersymbol interference term implies the sequence of M-ary symbols, the sequence being written $\{x_{l-1}, x_{l-2}, \ldots, x_{l-K_{ch}+1}\}$ and integrally contained in the ancestor state s' of the trellis considered.

By taking account of a perfect de-correlation of the bits of the decoded sequence after de-interleaving, in which case the relationship between conditional probabilities verifies equation (5):

$$Pr(s|s') = Pr(x_l = \overline{\partial}^{(b)}) = \prod_{i=1}^{\log_2 M} Pr(x_{l,i} = \partial_i^{(b)}) \quad (5)$$

equation (1) above can finally be sub-divided into two terms representative of sequence $S_1$, on the basis of equation (6):

$$L_{soft}^{(l)}(x_{l,i}) = \ln \underbrace{\frac{Pr(x_{l,i} = 1)}{Pr(x_{l,i} = 0)}}_{\text{log a priori term}} + \quad (6)$$

(logarithmic term of the a priori information)

$$\ln \frac{\max\limits_{b \in B, \partial^{(b)}=1} \alpha_{l-1}(s'; \hat{H}_{(z)}^{(l)}) \beta_l(s; \hat{H}_{(z)}^{(l)}) p\langle y_l | \Psi(\overline{\partial}^{(b)}) \rangle; \hat{H}_{(z)}^{(l)} \prod\limits_{l=1, l \neq i}^{\log_2 M} Pr(x_{l,1} = \partial_l^{(b)})}{\max\limits_{b \in B, \partial^{(b)}=0} \alpha_{l-1}(s'; \hat{H}_{(z)}^{(l)}) \beta_l(s; \hat{H}_{(z)}^{(l)}) p\langle y_l | \Psi(\overline{\partial}^{(b)}) \rangle; \hat{H}_{(z)}^{(l)} \prod\limits_{l=1, l \neq 1}^{\log_2 M} Pr(x_{l,1} = \partial_l^{(b)})}$$

log extrinsic term (logarithmic term of the extrinsic information)

This gives:

$$S''_2 = \ln \frac{Pr(x_{I,i} = 1)}{Pr(x_{I,i} = 0)}$$

and:

$$S'_1 = L_{soft}^{(I)}(x_{I,i}) - S''_2$$

More specifically, the SISO MLSE equalizer module can be transposed to the logarithmic domain by applying the following two rules:

Rule 1

Any exponential value $e^{-Q}$ where $Q \geq 0$ is transformed into $Q \leftarrow -\ln e^{-Q}$;

Rule 2

Any expression of the form $$-\ln\left\{\max_\varsigma e^{-Q_\varsigma}\right\}$$

is converted into $$\min_\varsigma Q_\varsigma$$

and computed recursively;

in these expressions, ln denotes the neperian logarithm, max and min representing the respective maximum, minimum values of the corresponding quantities.

A second specific embodiment of the system proposed by the invention will now be described with reference to FIG. 3c in the situation where the SISO equalizer module 1 is a SISO DDFSE equalizer module, the SISO decoder module 3 is a SISO BCJR module with soft inputs/outputs and the updated iterative estimation module 4 is provided in the form of a module of the bootstrap type.

Figure 3C:
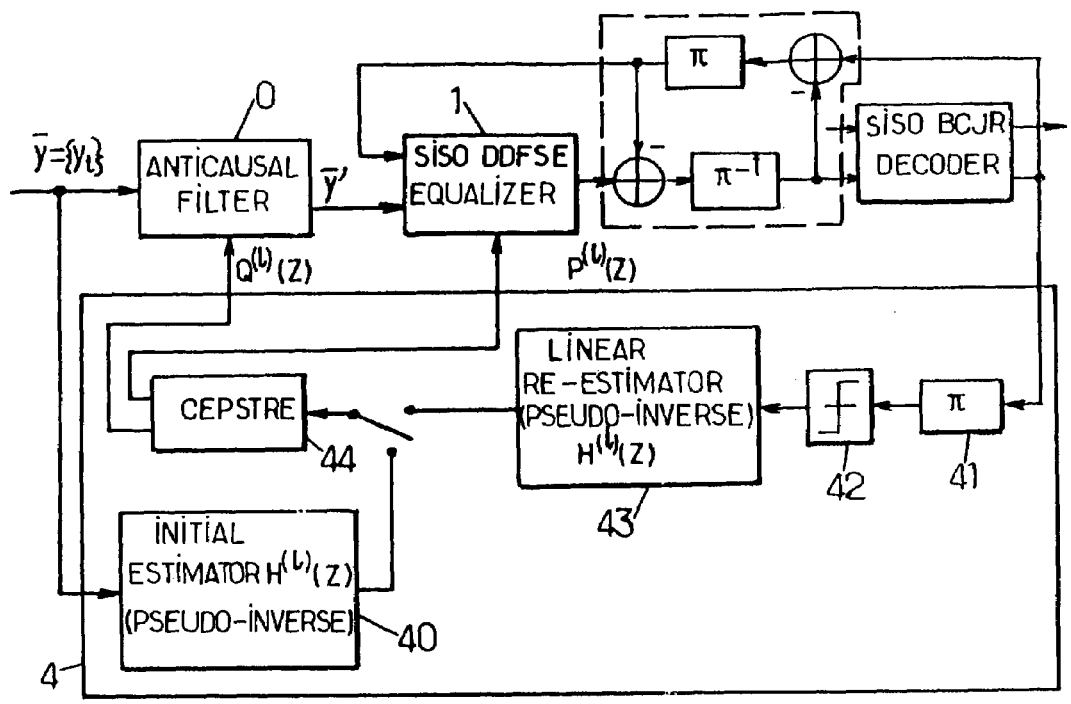
FIG. 3c shows, by way of illustration, a second variant of the system proposed by the invention and illustrated in FIG. 3a in the situation where the equalizer is a SISO DDFSE equalizer, the decoder a SISO BCJR decoder and the iterative channel estimator an estimator of the bootstrap type.

Referring to said FIG. 3c and for the implementing mode considered, the system proposed by the invention is then completed by an anticausal filtering module, shown by reference 0, receiving the computed anticausal filter parameters $Q_{(z)}^{(I)}$, this anticausal filter receiving the sequence of symbols y of received symbols and emitting a transformed sequence of received symbols, written $y^i$, under the conditions described earlier on in the description. Said transformed sequence of received symbols is then received by the SISO DDFSE equalizer module 1 in place and instead of the sequence of symbols y.

Again referring to the same FIG. 3c, the SISO DDFSE 1 equalizer module receives the computed values from the minimum phase filter $P_{(z)}^{(I)}$, said minimum phase filter again corresponding to a new minimum phase channel with each iteration, on which the equalizer module 1 of the SISO DDFSE type acts.

In order to run a module of the bootstrap type, the module 4 which provides an updated iterative estimation of the coefficients of the impulse response of the channel comprises, as illustrated in FIG. 3c, a module 41 for de-interleaving the sequence $S_2$ of weighted outputs on decoded bits resulting from the decoding process and emitted by the SISO BCJR decoder module 3, the de-interleaving process being shown by II. The de-interleaving module 41 issues a sequence of weighted outputs on re-interleaved decoded bits. In addition, said module 4 has a hard decision module 42 receiving the sequence of weighted outputs on decoded and re-interleaved bits of reconstituted received symbols. In particular, the module 42 may be provided in the form of a threshold comparator, enabling a sequence of reconstituted received symbol bits to be issued on the basis of a comparison with the above-mentioned threshold value.

Finally, the updated iterative estimation module 4 also has a module 43 for applying a linear pseudo-inversion on all the reconstituted received symbols, enabling an updated estimation of the coefficients of the impulse response of the transmission channel $\hat{H}_{(z)}^{(I+1)}$ to be produced.

The updated iterative estimation module 4 as illustrated in FIG. 3c also has an initial estimator 40 receiving the sequence of received symbols $\underline{y}$ and enabling the estimated value of the impulse response of the channel to be produced prior to any iteration, i.e. the values $\hat{H}_{(z)}^{(I=0)}$. A computing module 44 receives, firstly, the information emanating from module 40 and from module 43, initial estimator and linear re-estimator respectively, in order to generate the computed values of the anticausal filter $Q_{(z)}^{(I)}$ and the minimum phase $P_{(z)}^{(I)}$.

It should be pointed out, although this is not restrictive in any respect, that said computing module 44 may advantageously be a module which computes using the CEPSTRE method.

For a more detailed description of a computing module of this type and said method, reference may be made to the article entitled "*Filtre correcteur de phase pour égaliseurs sous-optimaux*", Annales de Télécomunications, no. 9–10, 1992, published by A VAUTIER, J. C. DANY, C. MOUROT.

The device illustrated in FIG. 3c therefore operates as follows. The unit comprising the equalizer module 1 of the SISO DDFSE type and the decoder module of the SISO BCJR type 3, constituting a turbo-detector, performs each iteration conditionally on the values of the minimum phase filter $P_{(z)}^{(I)}$.

For each of said iterations, the successive steps 1 and 2 are performed in the manner described below:

Step 1

Starting with the weighted outputs produced by the equalizer module 1, an extrinsic piece of information is computed at the binary level for each of the m packets of concatenated symbols, this extrinsic information corresponding to that produced by the first subtraction module 20 and denoted by the sequence $S'_1$.

Step 2

After de-interleaving by the de-interleaving module 21, the corresponding a priori information is used as a likelihood indicator on the encoded bits for the decoder module 3. The latter evaluates the reliabilities on each encoded bit in the sequence $S_2$ described earlier in the description, and the second subtraction module 22 extracts an extrinsic piece of information, which, after re-interleaving by module 23, is used by the equalizer module 1 as a priori information on the bits making up the received symbols with a view to a new iteration. At the end of each iteration of rank 1 performed by an exchange of a priori information between the equalizer module 1 and the decoder module 3, the updated iterative estimation module 4 makes, on the basis of the sequence $S_2$, a hard decision on each encoded bit on the basis of the reliability values represented by said sequence $S_2$. After re-interleaving by module 41, the flow of reconstituted and estimated encoded bits is used to re-construct each of the m packets of concatenated symbols. The bootstrap process is then applied, packet by packet. By means of a linear pseudo-inversion applied to all the component symbols, the linear re-estimation module 43 enables a new estimate to be generated, written $\hat{H}_{m(z)}^{(l+1)}$, of the coefficients of the transmission channel for each packet m considered. The parameters of the anticausal and minimum phase filters can then be derived for the considered packet of rank m for the forthcoming iteration of rank l+1.

Using bits produced at the output of the decoder module 3, i.e. the sequence $S_2$, means that it is possible to take advantage of the time diversity introduced by the interleaving generated on emission. Furthermore, for each iteration, the symbols, re-evaluated after re-interleaving and used for re-estimation purposes by the bootstrap process, are much more reliable than those obtained at the output of the equalizer module 1, since these latter offer the advantage of the corrective power introduced by the decoding process.

Various aspects will now be discussed as regards the theoretical justification of the operating mode used by the SISO DDFSE equalizer module 1 and what is known as the bootstrap process, which consists in re-estimating the 155 symbols of each of the m concatenated packets of received symbols on the basis of the reliabilities of the encoded bits at the output of the decoder module 3.

For a M-ary modulation and a transmission channel with $K_{ch}$ coefficients, the complexity of the decoding trellis in terms of number of states is expressed by the equation:

$$W_{mlse} = M^{Kch-1}.$$

Most of the test transmission channels used for the purpose of normalization have no more than $K_{ch}=6$ coefficients.

A MLSE equalization approach, optimum sequence by sequence, would require the use of a trellis comprising 32 768 states in the case of a MDP8 modulation where M=8. This modulation is used in the case of evolved GSM, EDGE. Such a trellis is not feasible from a practical point of view.

Consequently, it is therefore necessary to use a sub-optimum equalization process.

Of the equalizers and equalization methods based on simplified trellises, the DFSE type equalizer appears to be a good comprise between performance and complexity. In effect, the states of the trellis on which the DFSE equalizer operates are computed by taking account of only the first coefficients of the channel impulse response and the complexity of states in the requisite trellis is reduced to the value:

$$W_{dfse} = M^{Lch-1}$$

where $L_{ch}$ denotes the first coefficients of the impulse response of the transmission channel taken into account.

The DFSE equalization approach in effect consists in recovering the influence of residual coefficients when computing the metric by processing applied to the surviving paths. In the situation where a major part of the intersymbol interference is contained in the last $K_{ch}-L_{ch}$ coefficients of the channel impulse response, the deterioration in performance compared with an equalizer or an optimum MLSE equalization process is significant.

In order to guarantee an average performance close to optimum performance, corrective pre-filtering is applied upstream of the equalizer module 1, the purpose of this pre-filtering being to convert the impulse response of the equivalent discrete channel into a response corresponding to that of a minimum phase filter in which the energy of the signal is concentrated in the first $L_{ch}$ coefficients. This pre-filtering considerably increases the relevance of the transition metrics evaluated by the equalizer module 1.

The essential difference between the DFSE equalization process and the MLSE equalization process resides in the computation of the transition metric, all other equations and relationships being otherwise valid.

Accordingly, the value of the conditional probabilities is written in accordance with equation (7):

$$p\left(y_l \mid S'; \hat{P}_{(z)}^{(l)}\right) = \qquad (7)$$

$$p\left(y_l \mid \Psi(\overline{\sigma}^{(b)}); \hat{P}_{(z)}^{(l)}\right) \propto \exp\left(-\frac{1}{2\sigma^2}\left\|y_l - \hat{p}_0^{(l)} z_l - \hat{I}_l^{(1)} - \hat{I}_l^{(2)}\right\|^2\right)$$

where:

$P_{(z)}^{(l)}$ denotes the estimate of the minimum phase filter re-evaluated by the CEPSTRUM method at iteration 1;

$\hat{p}_j^{(l)}$ represents the j-th coefficient of the minimum phase filter;

$z_l = \Omega(\Theta^{(b)})$ is the complex number associated with the M-ary symbol number $\Theta^{(b)}$ carried by branch b;

$\hat{I}_l^{(1)}$ is the first part of the ISI term:

$$\hat{I}_l^{(1)} = \sum_{j=1}^{L_{ch}-1} \hat{p}_j^{(l)} \Psi(x_{l-j}) = \sum_{j=1}^{L_{ch}-1} \hat{p}_j^{(l)} z_{l-j}$$

which implies the sequence of M-ary symbols $\{x_{l-1}, x_{l-2}, \ldots, x_{l-Lch+1}\}$, integrally contained in the ancestor state s' of the sub-trellis;

$\hat{I}_l^{(2)}$ is the second part of the IES term:

$$\hat{I}_l^{(2)} = \sum_{j=1}^{L_{ch}-1} \hat{p}_j^{(l)} \Psi(x_{l-j}) = \sum_{j=1}^{L_{ch}-1} \hat{p}_j^{(l)} z_{l-j}$$

As regards $\hat{I}_l^{(2)}$, the second part of the term representing intersymbol interference, it implies the sequence of M-ary symbols $\{x_{l-Lch}, x_{l-Lch-1}, \ldots, x_{l-Kch+1}\}$ obtained by tracing back up the surviving path I(S') starting from the ancestor state s' of the sub-trellis and stored in a trace back matrix.

As regards implementing the re-estimation process of the bootstrap type, it consists in re-estimating the 155 symbols of each of the m packets of concatenated symbols on the basis of reliabilities on encoded bits at the output of the decoder module 3, i.e. on the basis of sequence $S_2$.

The flow of encoded bits thus re-estimated after the operations run by modules 41 and 42 is re-interleaved and then broken back down into m packets of 114×payload bits. In each of the packets considered, each triplet of bits allows a payload symbol MDP8 to be reconstituted. The rest of the symbols, tail symbols and hold symbols, are known a priori.

A complex matrix system is formed from each of the re-estimated packets, verifying equation (8):

$$\overline{y} = A^{(l)} \overline{h}^{(l+1)} + \overline{b} \qquad (8)$$

in which equation A defines a TOEPLITZ matrix defined by equation (9):

$$a_{i,j}^{(l)} = \hat{z}_{(i-j+Kch)mod l 55}^{(l)} \quad (9)$$

With the pseudo-inversion process, it is then possible to provide a solution which minimizes the error probability or the Euclidean distance, in accordance with equation 10:

$$\overline{\tilde{h}}^{(l+1)} = (A^+A)^{-1}A^+\overline{y} \quad (10)$$

The coefficient vector $\overline{\tilde{h}}^{(l+1)}$ of the channel is then used as an estimate of the value of the channel coefficients $\hat{H}_{(z)}^{(l+1)}$.

For a more detailed description of the decoding process and implementation of the SISO BJCR decoder 3, reference may be made to the article entitled "*Maximum Likelihood from incomplete Data via the Idem Algorithms*", published by A. P DEMSTER, N. M. LAIRD, D. B. RUBIN, J. ROY. Stat. Soc., Sor. 39 pp. 1–38, 1977.

Figure 3D:
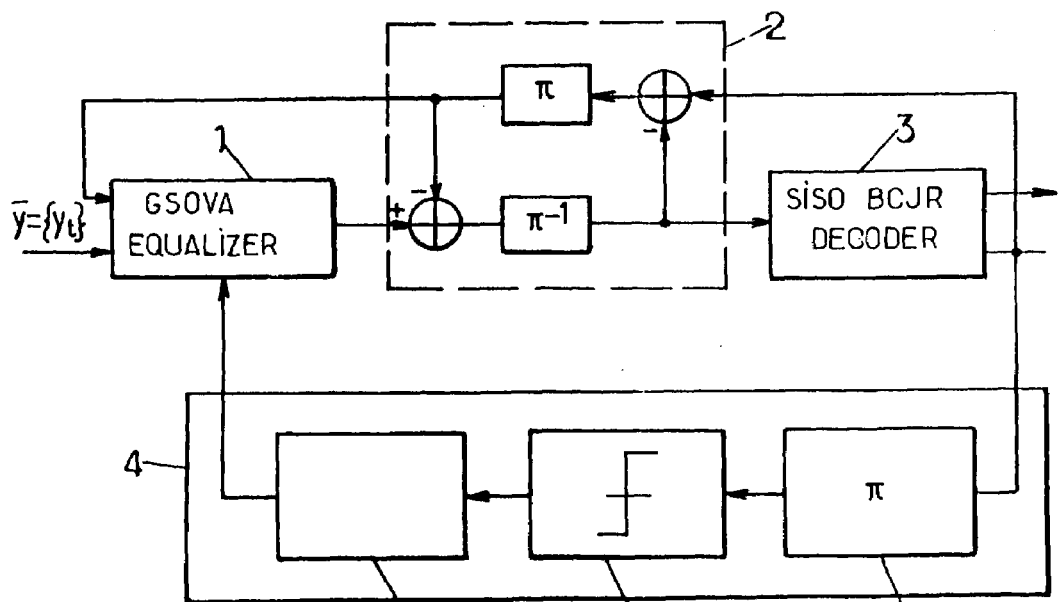
FIG. 3d shows, by way of illustration, a third variant of the system proposed by the invention and illustrated in 3a in the situation where the equalizer is a GSOVA equalizer, the decoder a SISO BCJR decoder and the iterative channel estimator an estimator of the bootstrap type.

Finally, a third specific embodiment of the system proposed by the invention may be implemented, as described with reference to FIG. 3d, in the situation where the equalizer module 1 is an equalizer module of the GSOVA type and the decoding module 3 is a BCJR module with soft inputs/outputs.

Under these conditions, as with the situation illustrated with reference to FIG. 3c, the module 4 may be an iterative module for re-estimating the coefficients of the impulse response of the transmission channel of the bootstrap type.

Various tests were conducted by simulating the method and system proposed by the invention.

Figure 4A:
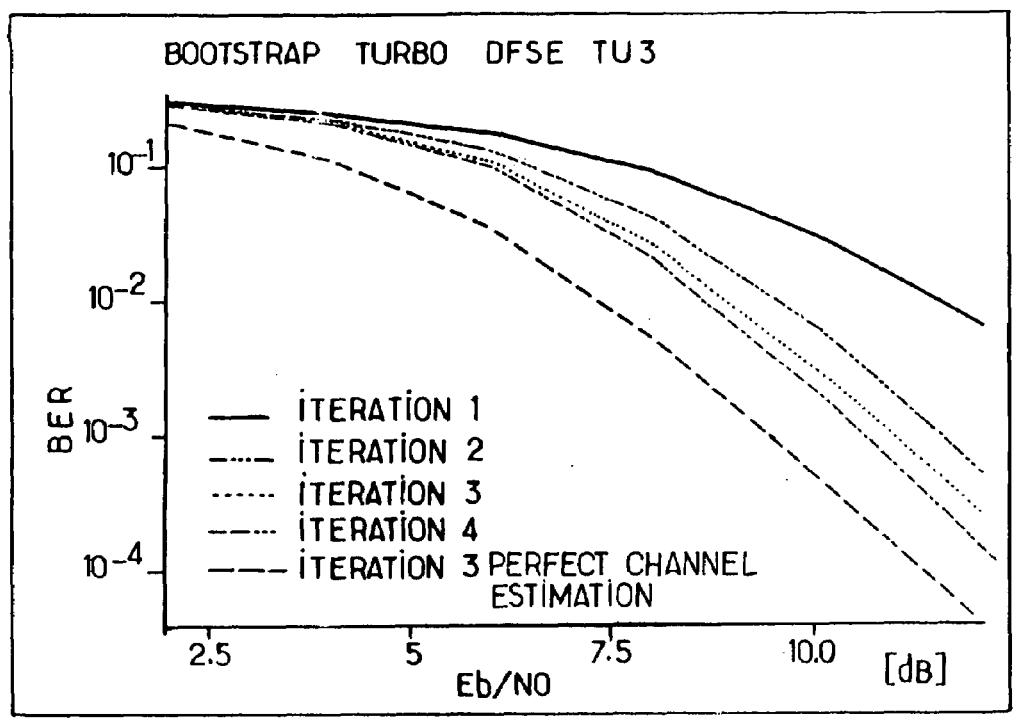
FIGS. 4a and 4b give diagrams simulating implementation of the method proposed by the invention, representing the value of the BER (Binary Error Rate) as a function of the signal-to-noise ratio expressed in dB for a re-estimation of the impulse response coefficients by the bootstrap process in the context of a MDP8 modulation applied to the evolved GSM EDGE and a GMSK modulation for Gaussian Minimum Shift Keying, applied to the GSM, respectively.

Accordingly, as illustrated in FIG. 4a, the transmission filter taken into account was that of the linearized GMSK. On reception, the roll-off factor of the Nyquist root filtering was set at 0.5. The convolutional code used on transmission to introduce redundant values into the transmitted symbol bits was a systematic recursive code of a constraint length of 5, producing a trellis diagram with 16 states. The polynomials generating the convolutional code were in the form as given by equation (11):

$$g_1(D) = 1 \quad (11)$$
$$g_2(D) = \frac{1 + D + D^2 + D^4}{1 + D + D^4}$$

These coding conditions imply a free distance of 7. The interleaving process Π implied m=8 symbol packets of the evolved GSM type, EDGE, i.e. a depth N=3×114×8. The MDP8 modulation chosen contained MDP2 modulation in order to be able to use the auto-correlation properties of the CAZAC sequence. Under these conditions, the channel synchronization and estimation algorithms for the first iteration are the same as those used in the GSM system.

The transmission rate was $R_s$=270.8 kbauds/s and the mobile radio channel tested was the Typical Urban channel in accordance with standard GSM 05.05. This transmission channel is a frequency selective channel modeled in the form of multiple RAYLEIGH paths, in which the impulse response coefficients comply with a complex Gaussian distribution, the variation of which is given by the normalized Doppler profile.

In the situation where the channel can be assumed to be constant over the duration of a symbol packet, the Doppler profile will not influence the performance of the unit in any way. This was the case in the context of the simulation run at the chosen speed of 3 km/h. Furthermore, as part of the simulation run, the transmission channel was considered as independent from one packet to the next, which is tantamount to taking an ideal frequency shift as a hypothesis.

FIG. 4a shows a diagram expressing the value of the binary error rate on the ordinates and the signal-to-noise ratio expressed in decibels on the abscissa.

From the above-mentioned figure, it can be seen that a significant improvement in performance gain in terms of bit error rates as the iterations are performed is achieved by applying the method and system proposed by the invention. In particular, no performance gain is observed beyond four iterations, whereas the first iteration substantially corresponds to that of the standard receiver.

The method and system proposed by the invention therefore enable a significant proportion, i.e. 1.7 dB, of the 2.7 dB degradation, introduced by estimating the transmission channel coefficients with noise, to be recouped. This property justifies the interest of applying a re-estimation, particularly a bootstrap re-estimation process. The performance curve at the iteration of order 4 is located at approximately 1 dB of the perfect estimation curve plotted under the hypothesis of iteration 3.

The table below evaluates the gain in decibels obtained by the method and system proposed by the invention in evolved GSM sequences, EDGE, as compared with standard receivers:

| Binary error rate (BER) | Gain in Db/standard EDGE receiver |
|---|---|
| le − 1 = $10^{-1}$ | 1.8 |
| le − 2 = $10^{-2}$ | 2.8 |
| le − 3 = $10^{-3}$ | 3.3 |
| le − 4 = $10^{-4}$ | 3.9 |
| le − 5 = $10^{-5}$ | 4.1 |

Figure 4B:
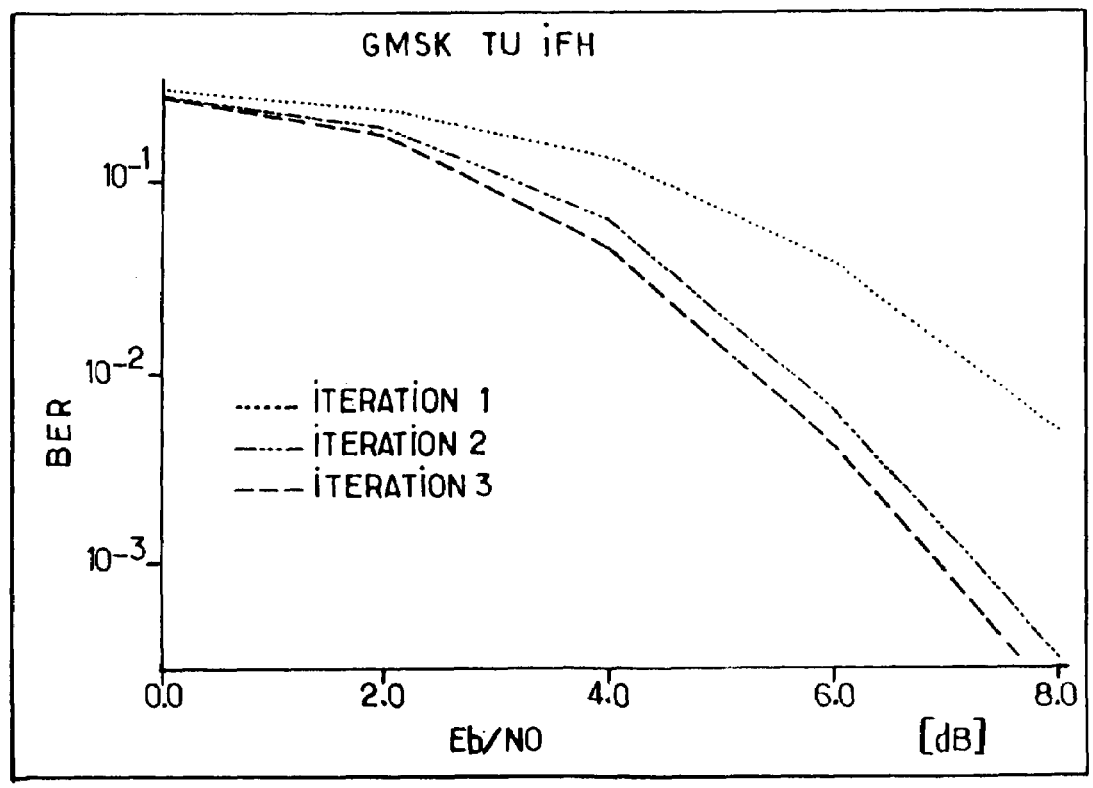

A GMSK modulation is used in the example illustrated in FIG. 4b, the emission filter remaining the same, and the reception filter used was of the Butterworth type with a spectral occupancy BT=0.6. Interleaving was chosen for 36 cells, i.e. 36×114 encoded bits, the convolution code and the Typical Urban transmission channel being identical to those shown in FIG. 4a. The ideal frequency shift conditions are also taken into account. As may be seen from FIG. 4b, a substantial gain of 2 dB is obtained for a binary error rate of $10^{-2}$.

Finally, the invention relates to any software product that will enable the method and system proposed by the invention to be implemented in accordance with the flow charts illustrated in the drawings of FIGS. 2a to 2f and 3a to 3d of this description.

What is claimed is:

1. A method of iteratively detecting and decoding encoded and interleaved symbols transmitted on a transmission channel, said symbols being transmitted on the basis of a sequence of binary symbols, each sequence of received symbols comprising at least specific learning symbols, in addition to the data, hold and tail symbols, wherein said method comprises the steps of:

prior to any iteration,
running an initial linear estimation of coefficients of the impulse response of the transmission channel $\hat{H}_{(z)}^{(l)}$ on the basis of the specific learning symbols transmitted;

by iteration:
  subjecting equalization and decoding process to an iterative process of exchanging a priori information, firstly relating to re-interleaved symbol bits from the decoding process in the case of the equalization process and, secondly, relating to de-interleaved encoded bits from the equalization process in the case of the decoding process;
  running an updated iterative re-estimation of coefficients of the impulse response of the transmission channel on the basis of the information resulting from the iterative equalization and decoding process;
  repeating the steps performed by iteration at the next iteration, and wherein said iterative process of exchanging a priori information comprises differentiating between a contribution of the transmission channel and a contribution of the decoding.

2. A method according to claim 1, wherein said differentiation step comprises, firstly, in:
  subtracting from sequence ($S_1$) of weighted outputs on equalized symbol bits, resulting from the equalization process, said a priori information ($S''_2$) on the symbol bits in order to generate an extrinsic sequence ($S'_1$);
  subjecting said extrinsic sequence ($S'_1$) to a de-interleaving process in order to generate a sequence of weighted inputs ($S''_1$) containing information from the channel and the a priori information on the encoded bits emanating from the equalization;
and, secondly, in:
  subtracting from sequences of weighted outputs ($S_2$) on decoded bits, resulting from the decoding process, said sequence of weighted inputs ($S''_1$) in order to generate a sequence of extrinsic information on decoded bits ($S'_2$);
  subjecting said sequence of extrinsic information on decoded bits ($S''_2$) to a re-interleaving process to generate said a priori information ($S''_2$) on the symbol bits.

3. A method according to claim 1, wherein said equalization process is a Viterbi SISO MLSE equalization process with weighted inputs coupled with a re-estimation by an iterative expectation maximization process.

4. A method according to claim 1, wherein the equalization process is a delayed decision feedback sequence estimator (DDFSE) process with weighted outputs coupled with a re-estimation of the bootstrap type.

5. A method according to claim 1, wherein the equalization process is a generalized soft output Viterbi algorithm (GSOVA) coupled with a re-estimation of the bootstrap type.

6. A method according to claim 1, wherein if said equalization process is an equalization process of the DDFSE type in which a single survivor per node is retained, said method further comprises the steps of:
  prior to any iteration,
    computing, from said initial linear estimation of the coefficients of the impulse response $\hat{H}_{(z)}^{(I)}$ of the transmission channel, a minimum phase filter $P_{(z)}^{(I)}$ and an anticausal filter $Q_{(z)}^{(I)}$ respectively, where $\hat{H}_{(z)}^{(I)} * Q_{(z)}^{(I)} = P_{(z)}^{(I)}$, the filter $P_{(z)}^{(I)}$ being defined as a transmission channel with an initial minimum phase, then
  by iteration,
    subjecting said sequence of received symbols to said equalization process, conditional on the values of the minimum phase filter $P_{(z)}^{(I)}$ defined as a successive minimum phase transmission channel for the current iteration, and, on the basis of said updated linear estimation $\hat{H}_{m(z)}^{(I+1)}$, for the next iteration;
    updating, for the next iteration, the minimum phase filter $P_{(z)}^{(I+1)}$ defined as a successive minimum phase channel and the anticausal filter $Q_{(z)}^{(I+1)}$ associated with the latter.

7. A method according to claim 6, wherein the computing step comprises computing the filter $P_{(z)}^{(I)}$ of the transmission channel with initial and respectively successive minimum phase and the associated anticausal filter $Q_{(z)}^{(I)}$ using the cepstre method.

8. A method according to claim 1, wherein said step of running an updated estimation of the coefficients of the impulse response $\hat{H}_{(z)}^{(I+1)}$ for the next iteration comprises:
  subjecting a sequence of weighted outputs on decoded bits to a re-interleaving process to generate a sequence of re-interleaved weighted outputs;
  subjecting said sequence of re-interleaved weighted outputs to a hard decision in order to reconstitute the symbols received;
  subjecting the reconstituted received symbols to a linear pseudo-inversion process on all the reconstituted received symbols.

9. A method according to claim 1, wherein said step of running an updated estimation of the coefficients of the impulse response of the transmission channel for the next iteration comprises applying an expectation maximization iteration using weighted outputs on symbol bits produced by the equalization process in the running iteration and the running estimated value of the coefficients of the impulse response of the transmission channel $\hat{H}_{(z)}^{(I)}$.

10. A system of detecting and iteratively decoding encoded and interleaved symbols on a transmission channel, these symbols being transmitted from a sequence of binary symbols, each sequence of received binary symbols comprising, in addition to the data, hold and tail symbols, at least specific learning symbols, wherein said system comprises at least:
  means (40) for running an initial estimation of the coefficients of the impulse response of the transmission channel;
  equalization means (1) with soft inputs and outputs receiving received symbols and emitting a sequence of weighted outputs on equalized symbol bits;
  a decoding means (3);
  means (2) for computing and iteratively exchanging a priori information, firstly on the symbol bits resulting from re-interleaved decoded symbol bits when the equalization means is active and, secondly, on de-interleaved encoded bits resulting from equalized symbol bits when the decoding means is active;
  wherein the decoding means (3) has soft inputs and outputs receiving said a priori information on the encoded bits and emitting a sequence of weighted outputs on decoded bits resulting from the decoding means; and
  means for (4) producing an updated iterative estimation of coefficients of the impulse response of the transmission channel on the basis of the information resulting from the equalization means and decoding means,
wherein said means for computing and iteratively exchanging a priori information is arranged for differentiating between a contribution of the transmission channel and a contribution of the decoding means.

11. A system of detecting and iteratively decoding encoded and interleaved symbols on a transmission channel, these symbols being transmitted from a sequence of binary symbols, each sequence of received binary symbols comprising, in addition to the data, hold and tail symbols, at least specific learning symbols, wherein said system comprises at least:

means (40) for running an initial estimation of the coefficients of the impulse response of the transmission channel;

equalization means (1) with soft inputs and outputs receiving received symbols and emitting a sequence of weighted outputs on equalized symbol bits;

a decoding means (3);

means (2) for computing and iteratively exchanging a priori information, firstly on the symbol bits resulting from re-interleaved decoded symbol bits when the equalization means is active and, secondly, on de-interleaved encoded bits resulting from equalized symbol bits when the decoding means is active;

wherein the decoding means (3) has soft inputs and outputs receiving said a priori information on the encoded bits and emitting a sequence of weighted outputs on decoded bits resulting from the decoding means; and means for (4) producing an updated iterative estimation of coefficients of the impulse response of the transmission channel on the basis of the information resulting from the equalization means and decoding means, wherein said means (2) for computing and iteratively exchanging a priori information comprise:

first means (20) for subtracting from sequence ($S_1$) of weighted outputs on equalized symbol bits said a priori information ($S''_2$) on the symbol bits in order to generate an extrinsic sequence ($S'_1$);

means (21) for de-interleaving said extrinsic sequence enabling a sequence of weighted inputs ($S''_1$) containing the information from the channel and the a priori information of the encoded bits from equalization to be generated;

second means for subtracting (22) from the sequence of weighted outputs on decoded bits ($S_2$) resulting from the decoding means said sequence of weighted inputs ($S''_1$) in order to generate a sequence of extrinsic information on decoded bits;

means (23) for re-interleaving said sequence of extrinsic information on decoded bits, enabling said a priori information ($S''_2$) on the symbol bits to be generated.

12. A system according to claim 10, wherein said means (4) running an updated iterative estimation comprise:

means for running an updated iterative estimation of the coefficients of the impulse response of the transmission channel by applying an expectation maximization process.

13. A system according to claim 10, wherein: said equalization means (1) is a maximum likelihood sequence estimator (MLSE) equalization means with soft inputs/outputs; said decoding means (3) are BCJR decoding means with soft inputs/outputs.

14. A system according to claim 10, wherein: said equalization means (1) is a delayed decision feedback sequence estimator (DDFSE) equalization means with soft inputs/outputs; said decoding means (3) is a BCJR decoding means with soft inputs/outputs.

15. A system according to claim 10, wherein: said equalization means (1) is a generalized soft output Viterbi algorithm (GSOVA) equalization means; said decoding means (3) is a BCJR decoding means with soft outputs.

16. A system of detecting and iteratively decoding encoded and interleaved symbols on a transmission channel, these symbols being transmitted from a sequence of binary symbols, each sequence of received binary symbols comprising, in addition to the data, hold and tail symbols, at least specific learning symbols, wherein said system comprises at least:

means (40) for running an initial estimation of the coefficients of the impulse response of the transmission channel;

equalization means (1) with soft inputs and outputs receiving received symbols and emitting a sequence of weighted outputs on equalized symbol bits;

a decoding means (3);

means (2) for computing and iteratively exchanging a priori information, firstly on the symbol bits resulting from re-interleaved decoded symbol bits when the equalization means is active and, secondly, on de-interleaved encoded bits resulting from equalized symbol bits when the decoding means is active;

wherein the decoding means (3) has soft inputs and outputs receiving said a priori information on the encoded bits and emitting a sequence of weighted outputs on decoded bits resulting from the decoding means; and updated iterative estimation means for (4) producing an updated iterative estimation of coefficients of the impulse response of the transmission channel on the basis of the information resulting from the equalization means and decoding means, wherein said updated iterative estimation means (4) comprise;

means (41) for re-interleaving the sequence ($S_2$) of weighted outputs on decoded bits resulting from the decoding means, emitting a sequence of weighted outputs on re-interleaved decoded bits;

hard decision means (42) receiving the sequence of weighted outputs on re-interleaved decoded bits and emitting a sequence of reconstituted received symbol bits;

means (43) for applying a linear pseudo-inversion on all the reconstituted received symbols, enabling an updated estimation of the coefficients of the impulse response of the transmission channel to be emitted.

* * * * *